United States Patent
Qu et al.

(10) Patent No.: US 10,560,298 B2
(45) Date of Patent: Feb. 11, 2020

(54) SIGNAL TRANSMISSION METHOD, TRANSMIT END, AND RECEIVE END

(71) Applicant: Huawei Technologies Co., Ltd., Shenzhen (CN)

(72) Inventors: Bingyu Qu, Beijing (CN); Chuanfeng He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/185,806

(22) Filed: Nov. 9, 2018

(65) Prior Publication Data

US 2019/0081839 A1 Mar. 14, 2019

Related U.S. Application Data

(63) Continuation of application No. PCT/CN2016/110005, filed on Dec. 15, 2016.

(30) Foreign Application Priority Data

May 11, 2016 (WO) ................ PCT/CN2016/081775

(51) Int. Cl.
*H04L 27/26* (2006.01)

(52) U.S. Cl.
CPC .......... *H04L 27/2615* (2013.01); *H04L 27/26* (2013.01); *H04L 27/2607* (2013.01);
(Continued)

(58) Field of Classification Search
CPC . H04L 27/2615; H04L 27/26; H04L 27/2607; H04L 27/2626
See application file for complete search history.

(56) References Cited

U.S. PATENT DOCUMENTS 9,794,012 B2* 10/2017 Malladi ................ H04B 7/0417
9,954,633 B2* 4/2018 Pralea ...................... H04J 11/00
(Continued)

FOREIGN PATENT DOCUMENTS

CN 102224719 A 10/2011
CN 102377719 A 3/2012
(Continued)

OTHER PUBLICATIONS

"Uplink Reference Signal Design for Short TTI," 3GPP TSG RAN WG1 Meeting #84, St Julian's, Malta, R1-160864, pp. 1-4, 3rd Generation Partnership Project—Valbonne, France (Feb. 15-19, 2016).
(Continued)

*Primary Examiner* — Janice N Tieu
(74) *Attorney, Agent, or Firm* — Leydig, Voit & Mayer, Ltd.

(57) ABSTRACT

This application discloses a signal transmission method. The method includes: mapping, to M evenly spaced subcarriers, each of a first sequence including M elements and a second sequence including M elements, where the M subcarriers are subcarriers on a same time domain symbol, the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots d_{K-1}$ having a length of K, where M=p×K, i is a variable, a value of i is 0, 1, ..., M−1, u and v each are one of 0, 1, ..., p−1, and v is not equal to u; generating a to-be-sent signal based on elements on the M subcarriers; and sending the to-be-sent signal.

12 Claims, 4 Drawing Sheets

(52) U.S. Cl.
CPC ...... *H04L 27/2611* (2013.01); *H04L 27/2614* (2013.01); *H04L 27/2626* (2013.01)

(56) References Cited

U.S. PATENT DOCUMENTS

| | | | |
|---|---|---|---|
| 2008/0159436 A1 | 7/2008 | Cho et al. | |
| 2008/0273522 A1* | 11/2008 | Luo | H04J 11/0076 370/350 |
| 2008/0310547 A1* | 12/2008 | Tiirola | H04L 27/2615 375/296 |
| 2010/0046360 A1* | 2/2010 | Tsuboi | H04J 11/0069 370/210 |
| 2010/0074343 A1 | 3/2010 | Gaal et al. | |
| 2010/0110873 A1* | 5/2010 | Han | H04J 13/0062 370/208 |
| 2014/0301324 A1 | 10/2014 | Cheng et al. | |
| 2014/0307661 A1 | 10/2014 | Wu et al. | |
| 2015/0263875 A1 | 9/2015 | Chang et al. | |

FOREIGN PATENT DOCUMENTS

| | | |
|---|---|---|
| CN | 102769592 A | 11/2012 |
| CN | 103139916 A | 6/2013 |
| CN | 103259637 A | 8/2013 |
| CN | 103391621 A | 11/2013 |
| CN | 103607265 A | 2/2014 |
| CN | 105490781 A | 4/2016 |
| CN | 105530212 A | 4/2016 |

OTHER PUBLICATIONS

"Link-level evaluation of TTI shortening in UL," 3GPP TSG RAN WG1 #84, St. Julian's, Malta, R1-160904, pp. 1-8, 3rd Generation Partnership Project—Valbonne, France (Feb. 15-19, 2016).

Wu et al, "Two-Dimension Adaptive Spectral Efficiency for SCFDMA Systems," IEEE, pp. 1-5, Institute of Electrical and Electronics Engineers—New York, New York (2010).

* cited by examiner

SIGNAL TRANSMISSION METHOD, TRANSMIT END, AND RECEIVE END

CROSS-REFERENCE TO RELATED APPLICATIONS

This application is a continuation of International Application No. PCT/CN2016/110005, filed on Dec. 15, 2016, which claims priority to International Application No. PCT/CN2016/081775, filed on May 11, 2016. The disclosures of the aforementioned applications are hereby incorporated by reference in their entireties.

TECHNICAL FIELD

Embodiments of this application relate to the communications field, and more specifically, to a signal transmission method, a transmit end, and a receive end.

BACKGROUND

An orthogonal frequency division multiplexing (OFDM) technology features strong multipath interference immunity, simple implementation of discrete Fourier transform, facilitating a multi-antenna transmission technology, and the like, and therefore, is widely applied to downlink signal transmission in an LTE system.

The OFDM technology is based on a multicarrier system. Therefore, a peak to average power ratio, referred to as a peak to average power ratio (PAPR) for short, of the OFDM technology is high, and a requirement on linear power amplification of a transmitter is very high. There is a low requirement on cost control on a base station side, and a transmitter having high power amplification linearity can be used. Therefore, the OFDM technology is usually used in downlink transmission. However, UE has limited transmit power and is cost-sensitive, a requirement on power amplification of a transmitter needs to be lowered, and coverage of the UE needs to meet a particular requirement. Therefore, a single carrier frequency division multiple access (SC-FDMA) technology is usually used in uplink transmission. Compared with the OFDM technology, the SC-FDMA technology has a lower PAPR, and can lower the requirement on power amplification of a transmitter, and improve power utilization.

An SC-FDMA solution used by a current LTE system is a discrete Fourier transform spread orthogonal frequency division multiplexing (DFT-S-OFDM) technology. The DFT-S-OFDM technology can achieve peak PAPR performance close to that of a single-carrier signal. Based on a low PAPR, hardware implementation complexity and costs can be reduced. When subcarrier groups occupied by different users are non-overlapping, the DFT-S-OFDM can implement orthogonal frequency division multiple access, to obtain a single-carrier orthogonal frequency division multiple access solution. Therefore, the DFT-S-OFDM technology is particularly applicable to uplink transmission of a mobile communications system.

In a current DFT-S-OFDM technology, for transmission of a plurality of signals or channels of one UE, to maintain PAPR performance close to that of a single-carrier signal, an uplink data signal and an uplink reference signal (such as a demodulation reference signal (DMRS)) are transmitted in a time division multiplexing manner.

On the other hand, a short-TTI feature is introduced to LTE Release 14 (Release 14, R14), and a shortest TTI may be a symbol. With the short-TTI feature, one symbol may need to carry both a reference signal and a data signal.

An example is used for description: One uplink symbol carries both a DMRS and a physical uplink control channel (PUCCH), and the DMRS and the PUCCH are orthogonal through code division multiplexing. In frequency domain, the DMRS and the PUCCH use different phases of one base sequence (base sequence) to map to a same group of subcarriers. The different phases of the base sequence are orthogonal. It should be noted that, different phases of one base sequence in frequency domain correspond to different cyclic shifts for the base sequence in a time domain sequence. If the different phases of the base sequence in frequency domain are orthogonal, different cyclic shifts for the base sequence in time domain are also orthogonal. In this specification, a representation of a base sequence in frequency domain is referred to as a frequency domain base sequence, and a representation of a base sequence in time domain is referred to as a time domain base sequence.

Specifically, assuming that a signal obtained by performing code division multiplexing on a DMRS and a PUCCH is sent on one symbol, and an occupied frequency domain resource is one resource block (RB), a length of a base sequence is 12, the DMRS and the PUCCH use two different phases of the base sequence, and a frequency domain signal obtained through code division multiplexing is expressed as:

$$S(n) = r_x(n)e^{j2\pi\alpha_1 n/12} + d(m)r_x(n)e^{j2\pi\alpha_2 n/12}, n=\{0,\ldots,11\},$$

where $r_x(n)$ is a base sequence having a length of 12 obtained through quadrature phase shift keying (QPSK) modulation, $\alpha_1$ and $\alpha_2$ are selected from the 12 phases, $\alpha_1 - \alpha_2$ is not equal to 0, and $d(m)$ is a symbol obtained by performing QPSK modulation on 2-bit information carried on the PUCCH sent on the symbol.

In the foregoing example, because a signal sent on one symbol is a signal obtained by superposing sequences that are obtained by rotating a plurality of phases of one base sequence, and a composite signal $S(n)$ is no longer an SC-FDMA signal, compared with the SC-FDMA signal, a PAPR increases. Consequently, power utilization is reduced, and performance of an up link is affected.

SUMMARY

This application provides a signal transmission method, a transmit end, and a receive end, to ensure a low PAPR in signal transmission when at least two signals are transmitted on one symbol.

According to a first aspect, a signal transmission method is provided. The method includes: mapping, by a transmit end to M evenly spaced subcarriers, a first sequence $a_0$, $a_1, \ldots, a_{M-1}$ including M elements, and mapping, to the M subcarriers, a second sequence $b_0, b_1, \ldots, b_{M-1}$ including M elements, where the M subcarriers are subcarriers on a same time domain symbol, the first sequence and the second sequence are code division-orthogonal, the first sequence $a_0$, $a_1, \ldots, a_{M-1}$ is obtained by extending a third sequence $c_0$, $c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, where M=p×K, $$a_i = c_{i \bmod K} \times e^{j\frac{2\pi i u}{M}}, b_i = d_{i \bmod K} \times e^{j\frac{2\pi i v}{M}},$$

i is a variable, a value of i is 0, 1, ..., M−1, u and v each are one of 0, 1, ..., p−1, v is not equal to u, and M, p, and K are all positive integers; generating, by the transmit end, a to-be-sent signal based on elements on the M subcarriers; and sending, by the transmit end, the to-be-sent signal.

According to the signal transmission method according to the first aspect, two sequences that are code division-orthogonal are constructed through periodic repetition and phase rotation, to ensure a relatively low PAPR in signal transmission when at least two signals are transmitted on one symbol, without reducing code resource utilization, thereby improving performance of an up link.

In a possible implementation of the first aspect, the third sequence $c_0, c_1, \ldots, c_{K-1}$ and the fourth sequence $d_0, d_1, \ldots, d_{K-1}$ may be sequences obtained by performing cyclic shifts on a same base sequence $x_0, x_1, \ldots, x_{K-1}$, where $c_r = x_r \times e^{j2\pi r \alpha_1}$, $d_r = x_r \times e^{j2\pi r \alpha_2}$, r is a variable, a value of r is 0, 1, ..., K−1, and $\alpha_1$ and $\alpha_2$ each are any real number.

In a possible implementation of the first aspect, $\alpha_1$ and $\alpha_2$ may be that $$\alpha_1 = \frac{\lambda_1}{pK}, \text{ and } \alpha_2 = \frac{\lambda_2}{pK},$$

where $\lambda_1$ and $\lambda_2$ each are any one of 0, 1, ..., pK−1.

In a possible implementation of the first aspect, the method further includes: sending, by the transmit end, first signaling, where the first signaling includes first cyclic shift parameter information of the first sequence, and the first cyclic shift parameter information is related to u and $\alpha_1$; and sending, by the transmit end, second signaling, where the second signaling includes second cyclic shift parameter information of the second sequence, and the second cyclic shift parameter information is related to v and $\alpha_2$.

In a possible implementation of the first aspect, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $$c_r = x_r \times e^{j\frac{2\pi r \beta_1}{K}}, d_r = x_r \times e^{j\frac{2\pi r \beta_2}{K}},$$

r is a variable, a value of r is 0, 1, ..., K−1, and $\beta_1$ and $\beta_2$ each are one of 0, 1, ..., K−1.

Two sequences, namely, the third sequence and the fourth sequence can be obtained by performing the cyclic shifts on the base sequence, and periodic repetition and phase rotation are performed on the third sequence and the fourth sequence, to construct two sequences that are code division-orthogonal.

In a possible implementation of the first aspect, the method further includes: sending, by the transmit end, first signaling, where the first signaling includes first cyclic shift parameter information of the first sequence, and the first cyclic shift parameter information is related to u and $\beta_1$; and sending, by the transmit end, second signaling, where the second signaling includes second cyclic shift parameter information of the second sequence, and the second cyclic shift parameter information is related to v and $\beta_2$.

In this implementation, because two signals are both sent on the M subcarriers on the same time domain symbol, the transmit end needs to notify the receive end of cyclic shifts for the two signals, for decoding by the receive end.

In a possible implementation of the first aspect, the generating, by the transmit end, a to-be-sent signal based on elements on the M subcarriers includes: adding, by the transmit end, to-be-transmitted information to the M subcarriers, and transforming, to be in time domain, elements on which the to-be-transmitted information is carried and that are on the M subcarriers, to generate the to-be-sent signal.

According to a second aspect, a signal transmission method is provided. The method includes: receiving, by a receive end, a signal on M evenly spaced subcarriers, where the M subcarriers are subcarriers on a same time domain symbol; performing, by the receive end, fast Fourier transformation FFT on the signal, to obtain a first to-be-received signal corresponding to a first sequence $a_0, a_1, \ldots, a_{M-1}$ and a second to-be-received signal corresponding to a second sequence $b_0, b_1, \ldots, b_{M-1}$, where the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, where M=p×K, $$a_i = c_{i \bmod K} \times e^{j\frac{2\pi i u}{M}}, b_i = d_{i \bmod K} \times e^{j\frac{2\pi i v}{M}},$$

i is a variable, a value of i is 0, 1, ..., M−1, u and v each are one of 0, 1, ..., p−1, v is not equal to u, and M, p, and K are all positive integers; and performing, by the receive end, signal processing on the first to-be-received signal and the second to-be-received signal.

In a possible implementation of the second aspect, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $c_r = x_r \times e^{j2\pi r \alpha_1}$, $d_r = x_r \times e^{j2\pi r \alpha_2}$, r is a variable, a value of r is 0, 1, ..., K−1, and $\alpha_1$ and $\alpha_2$ each are any real number.

In a possible implementation of the second aspect, $$\alpha_1 = \frac{\lambda_1}{pK}, \text{ and } \alpha_2 = \frac{\lambda_2}{pK},$$

where $\lambda_1$ and $\lambda_2$ each are any one of 0, 1, ..., pK−1.

In a possible implementation of the second aspect, the method further includes: receiving, by the receive end, first signaling, where the first signaling includes first cyclic shift parameter information of the first sequence, and the first cyclic shift parameter information is related to u and $\alpha_1$; and receiving, by the receive end, second signaling, where the second signaling includes second cyclic shift parameter information of the second sequence, and the second cyclic shift parameter information is related to v and $\alpha_2$.

In a possible implementation of the second aspect, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $$c_r = x_r \times e^{j\frac{2\pi r \beta_1}{K}}, d_r = x_r \times e^{j\frac{2\pi r \beta_2}{K}},$$

r is a variable, a value of r is 0, 1, ..., K−1, and $\beta_1$ and $\beta_2$ each are one of 0, 1, ..., K−1.

In a possible implementation of the second aspect, the receive end receives a cyclic shift parameter, and the method further includes: receiving, by the receive end, first signaling, where the first signaling includes first cyclic shift parameter information of the first sequence, and the first cyclic shift parameter information is related to u and $\beta_1$; and receiving, by the receive end, second signaling, where the second signaling includes second cyclic shift parameter information of the second sequence, and the second cyclic shift parameter information is related to v and $\beta_2$.

According to a third aspect, a signal transmission method is provided. The method includes: mapping, by a transmit end to M evenly spaced subcarriers, a first sequence including M elements, and mapping, to the M subcarriers, a second sequence including M elements, where the first sequence is a Fourier transform sequence of a fifth sequence, the second sequence is a Fourier transform sequence of a sixth sequence, the fifth sequence and the sixth sequence each include M elements, elements of the fifth sequence and the sixth sequence at a same position are not both non-zero elements, and the fifth sequence and the sixth sequence are code division-orthogonal, where M is a positive integer; generating, by the transmit end, a to-be-sent signal based on elements on the M subcarriers; and sending, by the transmit end, the to-be-sent signal.

According to the signal transmission method according to the third aspect, two sequences that are code division-orthogonal in time domain are constructed, and elements of the two sequences at a same position are not both non-zero elements, to ensure a relatively low PAPR in signal transmission when at least two signals are transmitted on one symbol, without reducing code resource utilization, thereby improving performance of an up link.

In a possible implementation of the third aspect, the fifth sequence is obtained by extending a seventh sequence, the sixth sequence is obtained by extending an eighth sequence, and the seventh sequence and the eighth sequence are code division-orthogonal.

The seventh sequence and the eighth sequence that are code division-orthogonal may be obtained in the following manner: The seventh sequence and the eighth sequence are sequences obtained by performing different cyclic shifts on a same base sequence.

In a specific example, the first sequence and the second sequence may be obtained in such a manner: The first sequence is $a_0, a_1, \ldots, a_{M-1}$, a frequency domain sequence corresponding to the seventh sequence is a third sequence $c_0, c_1, \ldots, c_{K-1}$ having a length of K, and the first sequence is obtained by extending the third sequence; and the second sequence is $b_0, b_1, \ldots, b_{M-1}$, a frequency domain sequence corresponding to the eighth sequence is a fourth sequence $d_0, d_1, \ldots, d_{K-1}$ having a length of K, and the second sequence is obtained by extending the fourth sequence, where $M=p\times K$, $$a_i = c_{i \bmod K} \times e^{j\frac{2\pi i u}{M}}, \quad b_i = d_{i \bmod K} \times e^{j\frac{2\pi i v}{M}},$$

i is a variable, a value of i is 0, 1, ..., M−1, u and v each are one of 0, 1, ..., p−1, v is not equal to u, and p and K are both positive integers.

In the possible implementation, the seventh sequence corresponding to the fifth sequence and the eighth sequence corresponding to the sixth sequence are time division multiplexed, so that after subsequent signal processing is performed on the two sequences, a sent signal still has a low PAPR.

In a possible implementation of the third aspect, before the mapping, to M evenly spaced subcarriers, a first sequence including M elements, the method further includes: performing, by the transmit end, first transform on the fifth sequence, to obtain the first sequence, where the first transform is M×M discrete Fourier transform DFT; and/or before the mapping, to the M subcarriers, a second sequence including M elements, the method further includes: performing, by the transmit end, second transform on the sixth sequence, to obtain the second sequence, where the second transform is M×M DFT.

In a possible implementation of the third aspect, the mapping, to the M subcarriers, a first sequence including M elements includes: determining the fifth sequence, where the fifth sequence $f_0, f_1, \ldots, f_{M-1}$ is obtained by extending the seventh sequence $h_0, h_1, \ldots, h_{K-1}$ having a length of K, the seventh sequence $h_0, h_1, \ldots, h_{K-1}$ is evenly spaced in the fifth sequence $f_0, f_1, \ldots, f_{M-1}$, a gap is p, where $M=p\times K$, and an element other than K elements $h_0, h_1, \ldots, h_{K-1}$ in the seventh sequence in the fifth sequence $f_0, f_1, \ldots, f_{M-1}$ is a zero element; and performing the M×M DFT on the fifth sequence, and mapping the fifth sequence to the M subcarriers; and the mapping, to the M subcarriers, a second sequence including M elements includes: determining the sixth sequence, where the sixth sequence $g_0, g_1, \ldots, g_{M-1}$ is obtained by extending the eighth sequence $j_0, j_1, \ldots, j_{K-1}$ having a length of K, the eighth sequence $j_0, j_1, \ldots, j_{K-1}$ is evenly spaced in the sixth sequence $g_0, g_1, \ldots, g_{M-1}$, a gap is p, where $M=p\times K$, and an element other than K elements $j_0, j_1, \ldots, j_{K-1}$ in the eighth sequence in the sixth sequence $g_0, g_1, \ldots, g_{M-1}$ is a zero element; and performing the M×M DFT on the sixth sequence, and mapping the sixth sequence to the M subcarriers.

In a possible implementation of the third aspect, the method further includes: mapping, by the transmit end to the M subcarriers, a ninth sequence including M elements, where the ninth sequence is a Fourier transform sequence of a tenth sequence, elements of any two time domain sequences in the tenth sequence, the fifth sequence, and the sixth sequence at a same position are not both non-zero elements, and any two time domain sequences in the fifth sequence, the sixth sequence, and the tenth sequence are code division-orthogonal.

According to a fourth aspect, a signal transmission method is provided. The method includes: receiving, by a receive end, a signal on M evenly spaced subcarriers, where the M subcarriers are subcarriers on a same time domain symbol; performing, by the receive end, fast Fourier transformation FFT on the signal, to obtain a first to-be-received signal corresponding to a first sequence and a second to-be-received signal corresponding to a second sequence, where the first sequence is a Fourier transform sequence of a fifth sequence, the second sequence is a Fourier transform sequence of a sixth sequence, the fifth sequence and the sixth sequence each include M elements, elements of the fifth sequence and the sixth sequence at a same position are not both non-zero elements, and the fifth sequence and the sixth sequence are code division-orthogonal, where M is a positive integer; and performing, by the receive end, signal processing on the first to-be-received signal and the second to-be-received signal.

In a possible implementation of the fourth aspect, the fifth sequence is obtained by extending a seventh sequence, the sixth sequence is obtained by extending an eighth sequence, and the seventh sequence and the eighth sequence are code division-orthogonal.

In a possible implementation of the fourth aspect, the seventh sequence and the eighth sequence are sequences obtained by performing different cyclic shifts on a same base sequence.

In a possible implementation of the fourth aspect, the first sequence is $a_0, a_1, \ldots, a_{M-1}$, a frequency domain sequence corresponding to the seventh sequence is a third sequence $c_0, c_1, \ldots, c_{K-1}$ having a length of K, and the first sequence is obtained by extending the third sequence; and the second sequence is $b_0, b_1, \ldots, b_{M-1}$, a frequency domain sequence corresponding to the eighth sequence is a fourth sequence $d_0, d_1, \ldots, d_{K-1}$ having a length of K, and the second sequence is obtained by extending the fourth sequence, where M=p×K, $$a_i = c_{i \bmod K} \times e^{j\frac{2\pi i u}{M}}, b_i = d_{i \bmod K} \times e^{j\frac{2\pi i v}{M}},$$

i is a variable, a value of i is 0, 1, ..., M−1, u and each are one of 0, 1, ..., p−1, v is not equal to u, and p and K are both positive integers.

In a possible implementation of the fourth aspect, the fifth sequence $f_0, f_1, \ldots, f_{M-1}$ is obtained by extending the seventh sequence $h_0, h_1, \ldots, h_{K-1}$ having a length of K, the seventh sequence $h_0, h_1, \ldots, h_{K-1}$ is evenly spaced in the fifth sequence $f_0, f_1, \ldots, f_{M-1}$, a gap is p, where M=p×K, and an element other than K elements $h_0, h_1, \ldots, h_{K-1}$ in the seventh sequence in the fifth sequence $f_0, f_1, \ldots, f_{M-1}$ is a zero element; and the sixth sequence $g_0, g_1, \ldots, g_{M-1}$ is obtained by extending the eighth sequence $j_0, j_1, \ldots, j_{K-1}$ having a length of K, the eighth sequence $j_0, j_1, \ldots, j_{K-1}$ is evenly spaced in the sixth sequence $g_0, g_1, \ldots, g_{M-1}$, a gap is p, where M=p×K, and an element other than K elements $j_0, j_1, \ldots, j_{K-1}$ in the eighth sequence in the sixth sequence $g_0, g_1, \ldots, g_{M-1}$ is a zero element.

In a possible implementation of the fourth aspect, the method further includes: performing, by the receive end, fast Fourier transformation FFT on the signal, to obtain a third to-be-received signal corresponding to a ninth sequence, where the ninth sequence is a Fourier transform sequence of a tenth sequence, elements of any two time domain sequences in the tenth sequence, the fifth sequence, and the sixth sequence at a same position are not both non-zero elements, and any two time domain sequences in the fifth sequence, the sixth sequence, and the tenth sequence are code division-orthogonal; and performing, by the receive end, signal processing on the third to-be-received signal.

In a possible implementation of the fourth aspect, the performing, by the receive end, signal processing on the first to-be-received signal and the second to-be-received signal includes: performing, by the receive end, inverse discrete Fourier transform IDFT on the first to-be-received signal, to obtain the fifth sequence corresponding to the first sequence; and/or performing, by the receive end, inverse discrete Fourier transform IDFT on the second to-be-received signal, to obtain the sixth sequence corresponding to the second sequence.

According to a fifth aspect, a transmit end is provided. The transmit end includes a processing module and a sending module, and is configured to perform the first aspect and the corresponding implementations of the first aspect.

According to a sixth aspect, a transmit end is provided. The transmit end includes a processor, a transceiver, and a memory, and is configured to perform the first aspect and the corresponding implementations of the first aspect, and the components of the transmit end according to the sixth aspect may correspond to the corresponding modules of the transmit end according to the fifth aspect.

According to a seventh aspect, a receive end is provided. The receive end includes a receiving module and a processing module, and is configured to perform the second aspect and the corresponding implementations of the second aspect.

According to an eighth aspect, a receive end is provided. The receive end includes a processor, a transceiver, and a memory, and is configured to perform the second aspect and the corresponding implementations of the second aspect, and the components of the receive end according to the eighth aspect may correspond to the corresponding modules of the receive end according to the seventh aspect.

In the corresponding aspects of this application and the possible implementations of the corresponding aspects, non-zero elements of the fifth sequence may be evenly spaced; and/or non-zero elements of the sixth sequence may be evenly spaced.

In the corresponding aspects of this application and the possible implementations of the corresponding aspects, the base sequence may be a ZC sequence, a cyclic extension sequence of a ZC sequence, a truncated sequence of a ZC sequence, or a reference signal sequence conforming to a standard of a 3rd Generation Partnership Project 3GPP Long Term Evolution LTE system.

In the corresponding aspects of this application and the possible implementations of the corresponding aspects, the fifth sequence may be a sequence obtained by performing inverse discrete Fourier transform IDFT on the first sequence, and the sixth sequence may be a sequence obtained by performing IDFT transform on the second sequence.

In this application, a time domain symbol may be an OFDM symbol or a DFT-S-OFDM symbol.

DESCRIPTION OF EMBODIMENTS

Figure 1:
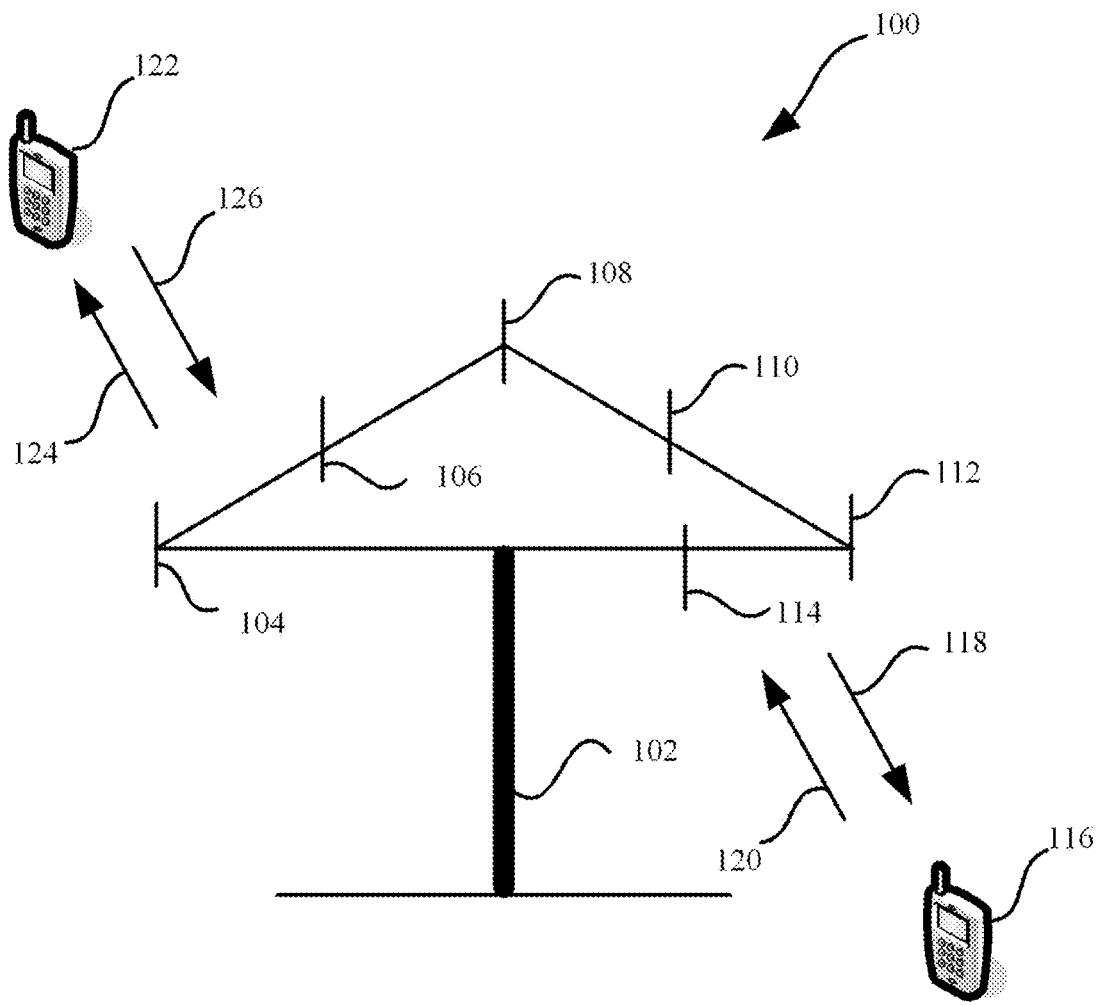
FIG. 1 is a schematic diagram of a communications system for signal transmission according to an embodiment of the present invention.

The following describes the technical solutions in embodiments of the present invention with reference to the accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that, the technical solutions in the embodiments of the present invention are applicable to a Long Term Evolution (LTE) architecture, and are further applicable to a universal mobile telecommunications system (UMTS) terrestrial radio access network (UTRAN) architecture, or a Global System for Mobile Communications (GSM)/enhanced data rate for GSM evolution (EDGE) system radio access network (GERAN) architecture. In the UTRAN architecture/GERAN architecture, a function of an MME is completed by a serving general packet radio service (GPRS) support node (SGSN), and a function of an SGW\PGW is completed by a gateway GPRS support node (GGSN). The technical solutions in the embodiments of the present invention are further applicable to another communications system such as a public land mobile network (PLMN) system and even a future 5G communications system. This is not limited in the embodiments of the present invention.

The embodiments of the present invention are applicable to a terminal device. The terminal device may communicate with one or more core networks by using a radio access network (RAN). The terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

The embodiments of the present invention are also applicable to a network device. The network device may be a device configured to communicate with the terminal device. For example, the network device may be a base transceiver station (BTS) in a GSM system or a CDMA system, may be a NodeB (NB) in a WCDMA system, or may be an evolved NodeB (EvolutionalNode B, eNB or eNodeB) in an LTE system; or the network device may be a relay station, an access point, an in-vehicle device, a wearable device, a network side device in a future 5G network, or a network device in a future evolved PLMN network.

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk, or a magnetic tape), an optical disc (for example, a compact disk (CD)), a digital versatile disk (DVD), a smart card and a flash memory component (for example, an erasable programmable read-only memory (EPROM)), a card, a stick, or a key drive). In addition, various storage media described in this specification may indicate one or more devices and/or other machine-readable media that are used to store information. The term "machine readable media" may include but is not limited to a radio channel, and various other media that can store, contain and/or carry an instruction and/or data.

FIG. 1 is a schematic diagram of a communications system for signal transmission according to an embodiment of the present invention. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain, and a person of ordinary skill in the art may understand that the transmitter chain and the receiver chain may each include a plurality of components (for example, a processor, a modulator, a multiplexer, a demodulator, a demultiplexer, and an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a band different from a band used by the reverse link 120, and the forward link 124 may use a band different from a band used by the reverse link 126.

For another example, in a time division duplex (TDD) system and a full duplex (Full Duplex) system, the forward link 118 and the reverse link 120 may use a same band, and the forward link 124 and the reverse link 126 may use a same band.

Each antenna (or an antenna group including a plurality of antennas) and/or an area designed for communication are/is referred to as a sector of the network device 102. For example, an antenna group may be designed to communicate with a terminal device in a sector within coverage of the network device 102. In a process in which the network device 102 respectively communicates with the terminal devices 116 and 122 by using the forward links 118 and 124, a transmit antenna of the network device 102 may improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly distributed within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits to be sent, by using a channel, to the wireless communications receiving apparatus. The data bit may be included in a transport block (or a plurality of transport blocks) of data, and the transport block may be segmented to produce a plurality of code blocks.

It should be understood that, this embodiment of the present invention is applicable to uplink transmission, for example, 120 and 126 shown in FIG. 1, and is further applicable to downlink transmission, for example, 118 and 124 shown in FIG. 1. FIG. 1 is merely an example of a simplified schematic diagram, and another network device that is not shown in FIG. 1 may be further included in a network.

On one hand, an orthogonal frequency division multiplexing (OFDM) technology features strong multipath interference immunity, simple implementation of discrete Fourier transform, facilitating a multi-antenna transmission technology, and the like, and therefore, is widely applied to downlink signal transmission in an LTE system.

The OFDM technology is based on a multicarrier system. Therefore, a peak to average power ratio, referred to as a peak to average power ratio (PAPR) for short, of the OFDM technology is high, and a requirement on linear power amplification of a transmitter is very high. There is a low requirement on cost control on a base station side, and a transmitter having high power amplification linearity can be used. Therefore, the OFDM technology is usually used in downlink transmission. However, UE has limited transmit power and is cost-sensitive, a requirement on power amplification of a transmitter needs to be lowered, and coverage of the UE needs to meet a particular requirement. Therefore, a single carrier frequency division multiple access (SC-FDMA) technology is usually used in uplink transmission. Compared with the OFDM technology, the SC-FDMA technology has a lower PAPR, and can lower the requirement on power amplification of a transmitter, and improve power utilization.

An SC-FDMA solution used by a current LTE system is a discrete Fourier transform spread orthogonal frequency division multiplexing (DFT-S-OFDM) technology. The DFT-S-OFDM technology can achieve peak PAPR performance close to that of a single-carrier signal. Based on a low PAPR, hardware implementation complexity and costs can be reduced. When subcarrier groups occupied by different users are non-overlapping, the DFT-S-OFDM can implement orthogonal frequency division multiple access, to obtain a single-carrier orthogonal frequency division multiple access solution. Therefore, the DFT-S-OFDM technology is particularly applicable to uplink transmission of a mobile communications system.

In a current DFT-S-OFDM technology, for transmission of a plurality of signals or channels of one UE, to maintain PAPR performance close to that of a single-carrier signal, an uplink data signal and an uplink reference signal (such as a demodulation reference signal (DMRS)) are transmitted in a time division multiplexing manner.

On the other hand, a spectrum is a very expensive resource in wireless communications. Modern communications systems such as a Global System for Mobile Communications (GSM), a Code Division Multiple Access (CDMA) 2000 system, a Wideband Code Division Multiple Access (WCDMA) system, and a 3rd Generation Partnership Project (3GPP) Long Term Evolution (LTE) system usually operates in a spectrum below 3 GHz. With expansion of intelligent terminal services, especially emergence of video services, it has been difficult for current spectrum resources to meet an explosive increase in user requirements on a capacity. High frequency bands with larger available bandwidth, especially a millimetric wave band, have gradually become candidate bands for next-generation communication systems, such as a band of 3 GHz to 200 GHz.

Different from operating bands of an existing LTE system and the like, a path loss of a high-frequency radio signal is high, and has limited coverage when the high-frequency radio signal is used for wireless communications. Based on a feature of a high PAPR of conventional OFDM, power utilization is further reduced, and coverage of the high-frequency radio signal becomes worse.

A transmission time interval (TTI) of a current LTE system has a length of one subframe, and includes 14 symbols. A reference signal and a data signal are usually carried on different symbols. A short-TTI feature is introduced to LTE Release 14 (Release 14, R14), and a shortest TTI may be a symbol. With the short-TTI feature, one symbol may need to carry both a reference signal and a data signal.

An example is used for description: One uplink symbol carries both a DMRS and a physical uplink control channel (PUCCH), and the DMRS and the PUCCH are orthogonal through code division multiplexing. In frequency domain, the DMRS and the PUCCH use different phases of one base sequence (base sequence) to map to a same group of subcarriers. The different phases of the base sequence are orthogonal. It should be noted that, different phases of one base sequence in frequency domain correspond to different cyclic shifts for the base sequence in time domain. If the different phases of the base sequence in frequency domain are orthogonal, different cyclic shifts for the base sequence in time domain are also orthogonal. In this specification, a representation of a base sequence in frequency domain is referred to as a frequency domain base sequence, and a representation of a base sequence in time domain is referred to as a time domain base sequence.

Specifically, assuming that a signal obtained by performing code division multiplexing on a DMRS and a PUCCH is sent on one symbol, and an occupied frequency domain resource is one resource block (RB), a length of a base sequence is 12, the DMRS and the PUCCH use two different phases of the base sequence, and a frequency domain signal obtained through code division multiplexing is expressed as:

$$S(n)=r_x(n)e^{j2\pi\alpha_1 n/12}+d(m)r_x(n)e^{j2\pi\alpha_2 n/12}, n=\{0,\ldots,11\},$$

where $r_x(n)$ is a base sequence having a length of 12 obtained through quadrature phase shift keying (QPSK) modulation, $\alpha_1$ and $\alpha_2$ are selected from the 12 phases, $\alpha_1-\alpha_2$ is not equal to 0, and d(m) is a symbol obtained by performing QPSK modulation on 2-bit information carried on the PUCCH sent on the symbol.

In the foregoing example, because a signal sent on one symbol is a signal obtained by superposing sequences that are obtained by rotating two phases of one base sequence, and a composite signal S(n) is no longer an SC-FDMA signal, compared with the SC-FDMA signal, a PAPR increases. Consequently, power utilization is reduced, and performance of an up link is affected.

Based on the foregoing descriptions, an embodiment of the present invention provides a signal transmission method. A transmit end maps, to M evenly spaced subcarriers, a first sequence including M elements, and maps, to the M subcarriers, a second sequence including M elements, where the first sequence is a Fourier transform sequence of a fifth sequence, the second sequence is a Fourier transform sequence of a sixth sequence, the fifth sequence and the sixth sequence each include M elements, elements of the fifth sequence and the sixth sequence at a same position are not both non-zero elements, and the fifth sequence and the sixth sequence are code division-orthogonal, where M is a positive integer; the transmit end generates a to-be-sent signal based on elements on the M subcarriers; and the transmit end sends the to-be-sent signal.

According to this embodiment of the present invention, two sequences that are code division-orthogonal in time domain are constructed, and elements of the two sequences at a same position are not both non-zero elements, to ensure a relatively low PAPR in signal transmission when at least two signals are transmitted on one symbol, without reducing code resource utilization, thereby improving performance of an up link.

In various embodiments of the present invention, for the M evenly spaced subcarriers, the M subcarriers may be numbered based on an ascending order or a descending order of frequencies of the subcarriers, and an index is 0, 1, 2, . . . , or M−1, where M is a positive integer. An element {x(i)} of the first sequence or the second sequence is mapped to a subcarrier having an index of i in the M subcarriers, where i=0, 1, 2, . . . , or M−1.

The M evenly spaced subcarriers may be continuously distributed. In this case, a gap is 1. Alternatively, the M evenly spaced subcarriers may be evenly discontinuously distributed. In this case, a gap is an integer greater than 1.

The M subcarriers in various embodiments of the present invention may be all subcarriers in entire bandwidth, or may be some subcarriers in entire bandwidth. This is not limited in the embodiments of the present invention.

In this embodiment of the present invention, a time domain symbol may be an OFDM symbol or a DFT-S-OFDM symbol.

It should be understood that, in this embodiment of the present invention, performing, in time domain, time division multiplexing on base sequences that are code division-orthogonal is equivalent to performing, in frequency domain, periodic repetition and phase rotation on the base sequences that are code division-orthogonal. How to transmit a signal is described in detail below, and it is proved that according to the signal transmission method in this embodiment of the present invention, a low PAPR can be ensured.

In this embodiment of the present invention, the transmit end needs to send p signals on a same time domain symbol, where p is greater than or equal to 2. Any two of the p signals may be combined in a plurality of manners, and these combinations are all applicable to various embodiments of the present invention. For example, any two signals may both be reference signals, may be a combination of a reference signal and a signal of control information carried on a control channel, may be a combination of a reference signal and a data signal carried on a data channel, may be a combination of a reference signal and a signal carrying other to-be-transmitted information, or may be a combination of any two signals other than the reference signal in the foregoing signals.

The reference signal may be an uplink reference signal or may be a downlink reference signal. For example, the reference signal may be a demodulation reference signal (DMRS), a cell-specific reference signal (CRS), a channel state information reference signal (Channel State Information Reference Signal, CSI-RS), or a sounding reference signal (SRS). This embodiment of the present invention is not limited thereto.

Correspondingly, the control information may be uplink control information carried on an uplink control channel, for example, uplink control information carried on a physical uplink control channel (PUCCH), or may be downlink control information carried on a downlink control channel, specifically, for example, downlink control information carried on a physical downlink control channel (PDCCH).

The data channel may be an uplink data channel, for example, a physical uplink shared channel (PUSCH), or may be a downlink data channel, for example, a physical downlink shared channel (PDSCH).

In addition, the other to-be-transmitted information may include system information carried on a broadcast channel, for example, information carried on a physical broadcast channel (PBCH), or may be a synchronization signal for synchronization, for example, a primary synchronization signal (PSS) or a secondary synchronization signal (SSS).

For ease of understanding, an example in which any two of the p signals are reference signals is used to discuss signal transmission first.

The two reference signals may be obtained by extending time domain base sequences. A fifth sequence in the two reference signals is obtained by extending a seventh sequence, and a sixth sequence in the two reference signals is obtained by extending an eighth sequence. The time domain base sequences corresponding to the two time domain signals are respectively the seventh sequence $\{h_i\}$ including an element $h_0, h_1, \ldots, h_{K-1}$, and the eighth sequence $\{j_i\}$ including an element $j_0, j_1, \ldots, j_{K-1}$.

In a embodiment, the seventh sequence $\{h_i\}$ and the eighth sequence $\{j_i\}$ are code division-orthogonal. For example, the seventh sequence $\{h_i\}$ and the eighth sequence $\{j_i\}$ are base sequences obtained by performing different cyclic shifts (cyclic shift) on a same base sequence, and lengths of the sequences are both N. A cyclic shift for the seventh sequence $\{h_i\}$ is $\alpha_1$, and a cyclic shift for the eighth sequence $\{j_i\}$ is $\alpha_2$, and $\alpha_1$ is different from $a_2$, to be specific, $\alpha_2-\alpha_1$ is not equal to 0. Certainly, two time domain base sequences that are code division-orthogonal may also be obtained in another form. This is not limited in this embodiment of the present invention.

The seventh sequence $\{h_i\}$ is orthogonal to the eighth sequence $\{j_i\}$. A cross-correlation feature of the seventh sequence $\{h_i\}$ and the eighth sequence $\{j_i\}$ is as follows:

$$h_i = \bar{r}_{u,v}(i+\alpha_1), i=0,1,\ldots,K-1; \text{ and}$$

$$j_i = \bar{r}_{u,v}(i+\alpha_2), i=0,1,\ldots,K-1,$$

where $\bar{r}_{u,v}(i)$ is an original base sequence.

A cross-correlation function for the seventh sequence $\{h_i\}$ and the eighth sequence $\{j_i\}$ is calculated, and $r(\alpha_2-\alpha_1)$ is a discrete periodic correlation function having a delay of $\alpha_2-\alpha_1$, where $\alpha_2-\alpha_1$ indicates a relative cyclic shift for the seventh sequence $\{h_i\}$ and the eighth sequence $\{j_i\}$:

$$r(\alpha_2 - \alpha_1) = \sum_{i=0}^{K-1} h_i j_i^* = \sum_{i=0}^{K-1} \bar{r}_{u,v}(i+\alpha_1)\bar{r}_{u,v}^*(i+\alpha_2) =$$

$$\delta((\alpha_2 - \alpha_1)\mathrm{mod}K) = \begin{cases} 1, & (\alpha_2 - \alpha_1)\mathrm{mod}K = 0 \\ 0, & \text{others} \end{cases}$$

When $\alpha_2-\alpha_1$ is not equal to 0, $(\alpha_2-\alpha_1)$ mod $K \neq 0$, and cross-correlation between the seventh sequence $\{h_i\}$ and the eighth sequence $\{j_i\}$ is 0. Therefore, base sequences obtained by performing different cyclic shifts on a same base sequence are orthogonal.

A modulo operation needs to be performed on the cyclic shift difference $\alpha_2-\alpha_1$ between the seventh sequence $\{h_i\}$ and the eighth sequence $\{j_i\}$ by using K. This is because a cyclic shift is performed on a sequence. After the cyclic shift for the seventh sequence $\{h_i\}$ relative to the eighth sequence $\{j_i\}$ exceeds K, it is equivalent to that a relative distance between the cyclic shifts for the seventh sequence $\{h_i\}$ and the eighth sequence $\{j_i\}$ is actually $(\alpha_2-\alpha_1)$ mod K.

For convenience of discussion below, it is assumed that p is equal to 2, to be specific, there are only two signals. From a perspective of the time domain, a processing process of the two signals may be as follows:

Zero is inserted to both an odd-numbered bit of the seventh sequence $\{h_i\}$ and an even-numbered bit of the eighth sequence $\{j_i\}$, to obtain
the fifth sequence $$f_i = \begin{cases} h_{i/2}, & i = \text{even} \\ 0, & i = \text{odd} \end{cases}, i = 0, 1, \ldots, 2K-1;$$

and
the sixth sequence $$g_i = \begin{cases} j_{(i-1)/2}, & n = \text{odd} \\ 0, & i = \text{even} \end{cases}, i = 0, 1, \ldots, 2K-1;$$

namely,
the fifth sequence $\{f_i\} = h_0, 0, h_1, 0, \ldots, h_{K-1}, 0$ $i=0, 1, \ldots, 2K-1$; and
the sixth sequence $\{g_i\} = 0, j_0, 0, j_1, \ldots 0, j_{K-1}$ $i=0, 1, \ldots, 2K-1$.

It is proved below that the fifth sequence $\{f_i\}$ and the sixth sequence $\{g_i\}$ obtained after zero is inserted respectively to the seventh sequence $\{h_i\}$ and the eighth sequence $\{j_i\}$ that are code division-orthogonal are still code division-orthogonal.

A cross-correlation function for the fifth sequence $\{f_i\}$ and the sixth sequence $\{g_i\}$ is calculated, and $R(\alpha')$ is a discrete periodic correlation function having a delay of $\alpha'$, where $\alpha'$ indicates a relative cyclic shift for the fifth sequence $\{f_i\}$ and the sixth sequence $\{g_i\}$:

$$R(\alpha') = \sum_{i=0}^{2K-1} f_i g_{i+\alpha'}^*$$

$$= \begin{cases} 0, & \alpha' \in \text{even} \\ \delta((\alpha_2 + (\alpha'-1)/2 - \alpha_1)\mathrm{mod}2K), & \alpha' \in \text{odd} \end{cases}.$$

$$= \begin{cases} 0, & \alpha' \in \text{even} \\ 1, & \alpha_2 + (\alpha'-1)/2 - \alpha_1)\mathrm{mod}2K = 0, \alpha' \in \text{odd} \\ 0, & \alpha_2 + (\alpha'-1)/2 - \alpha_1)\mathrm{mod}2K \neq 0, \alpha' \in \text{odd} \end{cases}$$

When $\alpha_2+(\alpha'-1)/2-\alpha_1$ is not equal to 0, $(\alpha_2+(\alpha-1)/2-\alpha_1)$ mod $2K \neq 0$, so that $R(\alpha')=0$. Cross-correlation between the seventh sequence $\{h_i\}$ and the eighth sequence $\{j_i\}$ is 0. In this case, the fifth sequence $\{f_i\}$ and the sixth sequence $\{g_i\}$ are code division-orthogonal.

To reduce a PAPR of a finally sent signal, non-zero elements of two time domain signals before DFT need to be multiplexed. To be specific, elements of the fifth sequence $\{f_i\}$ and the sixth sequence $\{g_i\}$ at a same position are not both non-zero elements. A same position means that for two time domain sequences each including M elements, the elements have a same position in the sequences. To be specific, elements of the fifth sequence and the sixth sequence at a same moment are not both non-zero. In this way, in time domain, it is equivalent to that the seventh sequence corresponding to the fifth sequence and the eighth sequence corresponding to the sixth sequence are time division multiplexed, so that after a series of subsequent transform such as DFT and IFFT and other processing are performed on the two sequences, a sent signal has a low PAPR.

A multiplexed time domain sequence may be denoted as $\{T_i\}$:

$$\{T_i\} = f_i + g_i = h_0 j_0, h_1 j_1, \ldots, h_{K-1} j_{K-1} \ i = 0, 1, \ldots, 2K-1.$$

In conclusion, the fifth sequence and the sixth sequence that are code division-orthogonal need to be formed first.

It should be understood that, in this embodiment of the present invention, the fifth sequence and the sixth sequence are code division-orthogonal, but the seventh sequence and the eighth sequence may be code division-orthogonal, or may not be code division-orthogonal. Because when a condition $(\alpha_2+(\alpha'-1)/2-\alpha_1)$ mod $2K \neq 0$ is satisfied, $(\alpha_2-\alpha_1)$ mod $K=0$ is allowed. To be specific, results obtained after a modulo operation is performed on the cyclic shifts for the seventh sequence and the eighth sequence by using K are allowed to be the same. For example, the seventh sequence and the eighth sequence may be a same base sequence. When the fifth sequence is obtained by extending the seventh sequence, and the sixth sequence is obtained by extending the eighth sequence, a proper extension manner is used (for example, zero is respectively inserted to an odd-numbered bit and an even-numbered bit of the same base sequence) to cause the fifth sequence and the sixth sequence to be code division-orthogonal.

In this embodiment of the present invention, non-zero elements in a time domain sequence obtained by extending a time domain base sequence are evenly spaced. In this embodiment of the present invention, if a time domain sequence can be obtained in another manner, non-zero elements may not be evenly spaced. Therefore, non-zero elements of the fifth sequence are evenly spaced; and/or non-zero elements of the sixth sequence are evenly spaced. Whether non-zero data is evenly spaced is not limited in this embodiment of the present invention.

The fifth sequence and the sixth sequence that are obtained in the foregoing extension manner each include M elements, and the elements of the fifth sequence and the sixth sequence at the same position are not both non-zero elements. The seventh sequence and the eighth sequence each include K elements, where M=p×K. Corresponding to the foregoing descriptions, p is equal to 2, to be specific, when there are two signals on M subcarriers in total, M=2K. In this embodiment of the present invention, the base sequence may alternatively be extended in another manner, to obtain the fifth sequence and the sixth sequence that are code division-orthogonal. This is not limited in this embodiment of the present invention.

Subsequently, there are a plurality of manners in which the time domain sequence is transformed and then mapped to the M subcarriers.

One manner thereof may be as follows: First transform is performed on the fifth sequence, to obtain a first sequence, where the first transform is M×M discrete Fourier transform DFT, and the first sequence including M elements is mapped to the M subcarriers; and/or second transform is performed on the sixth sequence, to obtain a second sequence, where the second transform is M×M DFT, and the second sequence including M elements is mapped to the M same subcarriers.

It should be understood that, herein, "and/or" means that an operation of performing M×M DFT on a time domain sequence, to obtain a frequency domain sequence, and then mapping the frequency domain sequence to M subcarriers may be implemented only on the fifth sequence, and another manner is used for the sixth sequence; or the operation may be implemented only on the sixth sequence, and another manner is used for the fifth sequence; or the operation may be implemented on both the fifth sequence and the sixth sequence. This is not limited in this embodiment of the present invention.

Figure 2:
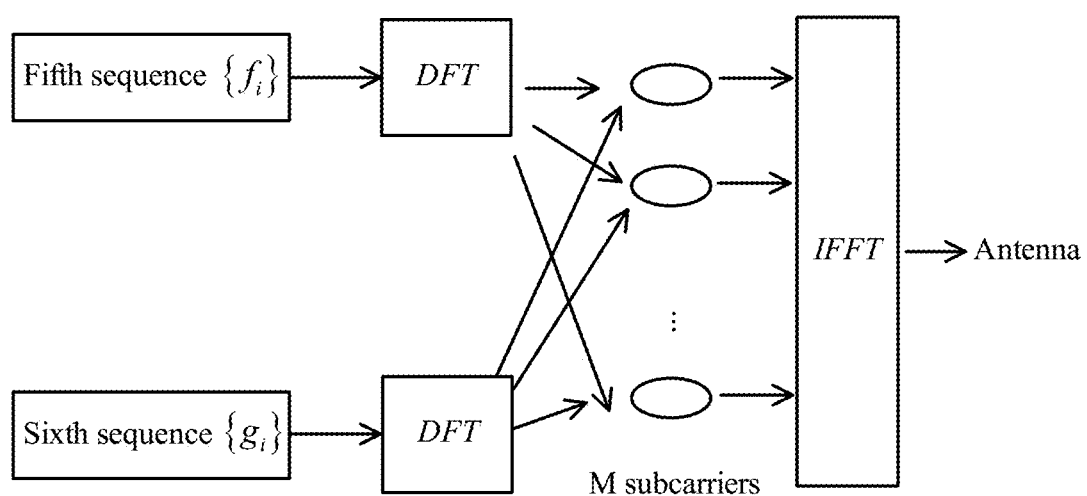
FIG. 2 is a schematic diagram of a signal transmission method according to an embodiment of the present invention.

Corresponding to the foregoing descriptions, as shown in FIG. 2, 2K×2K DFT may be performed on both the fifth sequence $\{f_i\}$ and the sixth sequence $\{g_i\}$, and then the fifth sequence $\{f_i\}$ and the sixth sequence are mapped to a same subcarrier group having 2K subcarriers. This manner may alternatively be considered as that the 2K×2K DFT is performed on both the fifth sequence $\{f_i\}$ and the sixth sequence $\{g_i\}$; and sequences obtained through the DFT are both mapped to the same subcarrier group having the 2K subcarriers and then added. Alternatively, it may be considered as that the 2K×2K DFT is performed on both the fifth sequence $\{f_i\}$ and the sixth sequence $\{g_i\}$; and then, sequences obtained through the DFT are added, and are mapped to a subcarrier group having 2K subcarriers.

Figure 3:
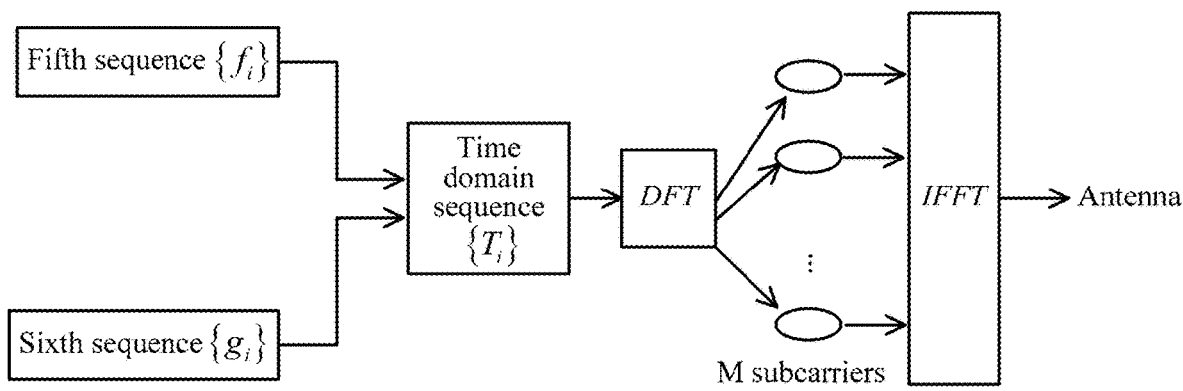
FIG. 3 is a schematic diagram of a signal transmission method according to another embodiment of the present invention.

Another manner thereof may be as follows: As shown in FIG. 3, the fifth sequence $\{f_i\}$ and the sixth sequence $\{g_i\}$ may be added, to obtain a time domain sequence $\{T_i\}$, 2K×2K DFT is performed on $\{T_i\}$, and then $\{T_i\}$ is mapped to a subcarrier group having 2K subcarriers. There may be a variety of implementations of this embodiment of the present invention, and this is not limited herein.

An example in which any two signals are both reference signals is used above to describe a signal transmission process. It should be understood that, when a signal of control information carried on a control channel, a data signal carried on a data channel, or a signal carrying other to-be-transmitted information exists in any two signals, at a time domain stage or a frequency domain stage of signal forming, the signal may be multiplied by a corresponding sequence, to carry to-be-transmitted information.

Next, the transmit end transforms elements on the M subcarriers to be in time domain, and generates and sends a to-be-sent signal. Specifically, the transmit end may perform transform such as inverse fast Fourier transformation (Inverse Fast Fourier Transformation, IFFT) on the elements on the M subcarriers, to be specific, after zero is added to two ends of a frequency domain signal, generate a signal in time domain, namely, a to-be-sent signal, and transmit the to-be-sent signal by using an antenna. Certainly, in the process, other processing may further be performed on the signal. This is not limited in the present invention.

Therefore, in a embodiment of the present invention, the mapping, to M subcarriers, a first sequence including M elements includes: determining the fifth sequence, where the fifth sequence $f_0, f_1, \ldots, f_{M-1}$ is obtained by extending the seventh sequence $h_0, h_1, \ldots, h_{K-1}$ having a length of K, the seventh sequence $h_0, h_1, \ldots, h_{K-1}$ is evenly spaced in the fifth sequence $f_0, f_1, \ldots, f_{M-1}$, a gap is p, where M=p×K, and an element other than K elements $h_0, h_1, \ldots, h_{K-1}$ in the seventh sequence in the fifth sequence $f_0, f_1, \ldots, f_{M-1}$ is a zero element; and performing the M×M DFT on the fifth sequence, and mapping the fifth sequence to the M subcarriers; and the mapping, to the M subcarriers, a second sequence including M elements includes: determining the sixth sequence, where the sixth sequence $g_0, g_1, \ldots, g_{M-1}$ is obtained by extending the eighth sequence $j_0, j_1, \ldots, j_{K-1}$ having a length of K, the eighth sequence $j_0, j_1, \ldots, j_{K-1}$ is evenly spaced in the sixth sequence $g_0, g_1, \ldots, g_{M-1}$, a gap is p, where M=p×K, and an element other than K elements $j_0, j_1, \ldots, j_{K-1}$ in the eighth sequence in the sixth sequence $g_0, g_1, \ldots, g_{M-1}$ is a zero element; and performing the M×M DFT on the sixth sequence, and mapping the sixth sequence to the M subcarriers.

An example in which two time domain signals are sent on a same time domain symbol is used for description above, and the method is also applicable to a case of a plurality of (for example, p) time domain signals. Sequences obtained by performing code division and time division on the plurality of time domain signals are code division-orthogonal. For example, three time domain signals may be respectively:

the fifth sequence $\{f_i\}$=$h_0$, 0, 0, $h_1$, 0, 0, ..., $h_{K-1}$, 0, 0 i=0, 1, ..., 3K−1;

the sixth sequence $\{g_i\}$=0, $j_0$, 0, 0, $j_1$, 0, ...0, $j_{K-1}$ 0 i=0, 1, ..., 3K−1; and a tenth sequence $\{n_i\}$=0, 0, $q_0$, 0, 0, $q_1$, ..., 0, 0, $q_{K-1}$ i=0, 1, ..., 3K−1.

A time domain sequence obtained after the three time domain signals are multiplexed may be denoted as $\{T_i\}$:

$$\{T_i\}=f_i+g_i+n_i=h_0,j_0,q_0,h_1,j_1,q_1,\ldots,h_{K-1},j_{K-1},q_{K-1}$$
$$i=0,1,\ldots,3K-1.$$

In this case, M=3K. For any extension, M=p×K. It may be proved that sequences obtained by performing code division and time division on the plurality of time domain signals are still code division-orthogonal. When the three time domain signals are sent on a same time domain symbol, any two of the fifth sequence, the sixth sequence, and the tenth sequence are code division-orthogonal.

In an embodiment, of the present invention, of performing cyclic shifts on a time domain base sequence, to obtain signals that are code division-orthogonal, when transmission is performed by using a radio channel, because a damage caused by channel delay extension to orthogonality by cyclic shifts needs to be prevented, a sufficient gap needs to exist between corresponding cyclic shifts, to be specific, be greater than delay extension, not all cyclic shifts can be used for orthogonal sequences. A base sequence having a length of 12 is used as an example. The base sequence has 12 cyclic shifts in total. If a gap between the cyclic shifts needs to be 2, only sixth evenly spaced cyclic shifts can be configured for a user. After the foregoing requirement is met, signals of the transmit end are code division-orthogonal, and after the signals are transmitted by using a radio channel, the signals can still be code division-orthogonal on a receive end.

Figure 4:
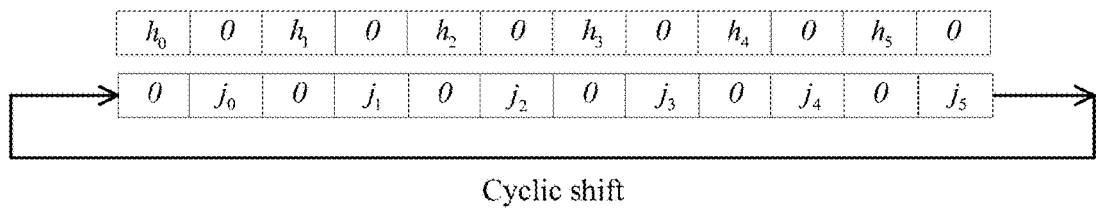
FIG. 4 is a schematic diagram of a cyclic shift according to an embodiment of the present invention.

For this embodiment of the present invention, multiplexing of two sequences is used as an example. A length of a base sequence is reduced to 6, and a length of the sequence after zero insertion is 12. The length of the base sequence becomes shorter. However, the sequences having a length of 12 and obtained after zero is inserted to cyclic shifts for the base sequence are still orthogonal. Therefore, if a gap between cyclic shifts still needs to be 2, to ensure orthogonality, a gap between the cyclic shifts for the base sequence having a length of 6 may be reduced to 1, and still six cyclic shifts can be configured for a user, and the cyclic shifts are not reduced due to reduction of the length of the base sequence. This is because a cyclic shift of 2 bits on the two sequences having a length of 12 for which zero is respectively inserted to an odd-numbered bit and an even-numbered bit is equivalent to a cyclic shift of 1 bit on the base sequence having a length of 6, as shown in FIG. 4.

Figure 5:
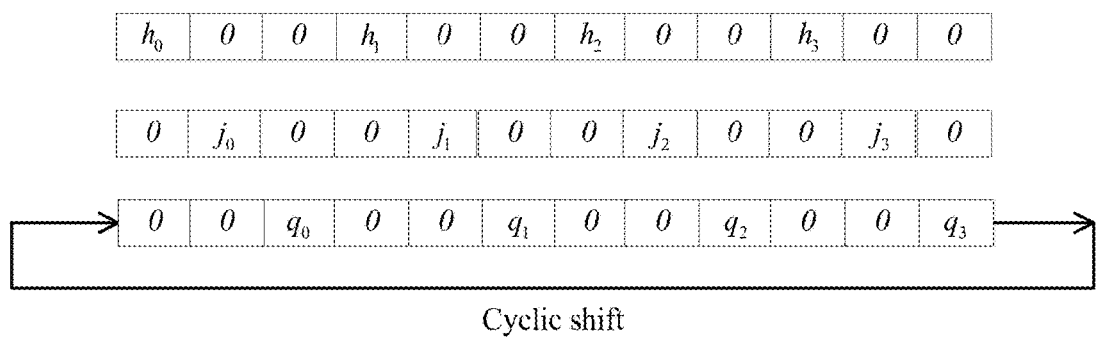
FIG. 5 is a schematic diagram of a cyclic shift according to another embodiment of the present invention.

Similarly, a case of multiplexing of three sequences is shown in FIG. 5. Multiplexing of three sequences is used as an example. A length of a base sequence is reduced to 4, and a length of the sequence after zero insertion is 12. A cyclic shift of 3 bits on the sequence having a length of 12 after the zero insertion is equivalent to a cyclic shift of 1 bit on the base sequence having a length of 4. However, in this case, because the base sequence has only 4 bits, and there are a maximum of four available cyclic shifts, if a gap between the cyclic shifts is 1, a requirement that a gap between available cyclic shifts for a corresponding base sequence having a length of 12 should be 2 can still be met.

It is proved above that, in this embodiment of the present invention, two base sequences are respectively extended, to obtain two time domain sequences that are code division-orthogonal, and time division multiplexing is performed on the two base sequences; compared with an existing code division multiplexing manner, system code resource utilization is not reduced. Therefore, according to the method in this embodiment of the present invention, a low PAPR can be ensured, and high code resource utilization can be ensured.

In addition, in this embodiment of the present invention, a time domain signal having a low PAPR may alternatively be generated by using a method of generating a corresponding frequency domain signal.

Figure 6:
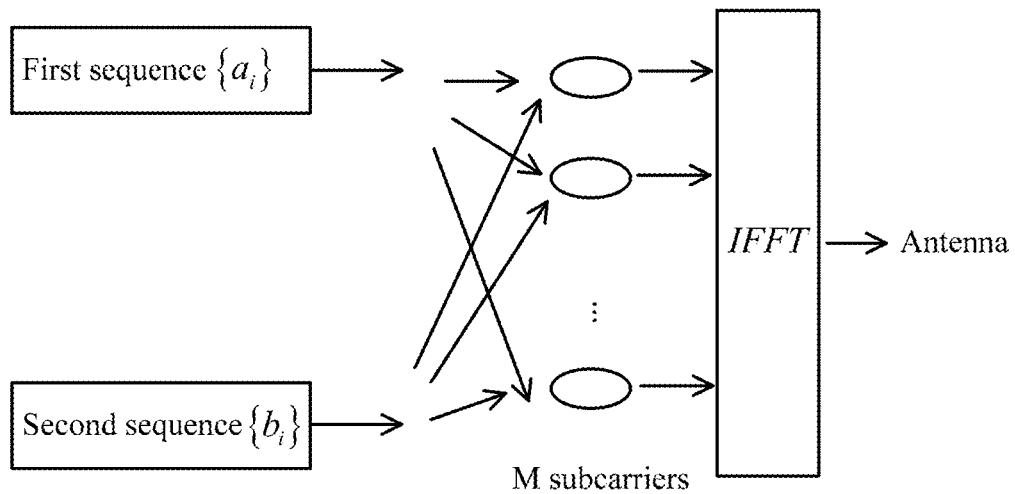
FIG. 6 is a schematic diagram of a signal transmission method according to still another embodiment of the present invention.

From a perspective of the frequency domain, a processing process of the two signals is shown in FIG. 6:

A third sequence $\{c_r\}$ includes an element $c_0, c_1, \ldots, c_{K-1}$, and a fourth sequence $\{d_r\}$ includes an element $d_0, d_1, \ldots, d_{K-1}$. The third sequence $\{c_r\}$ and the fourth sequence $\{d_r\}$ may be sequences obtained by performing phase rotation on a same frequency domain base sequence, and phase rotation respectively is $\beta_1$ and $\beta_2$, where $$c_r = x_r \times e^{j\frac{2\pi r \beta_1}{K}}, r = 0, 1, \ldots, K-1; \text{ and}$$

$$d_r = x_r \times e^{j\frac{2\pi r \beta_2}{K}}, r = 0, 1, \ldots, K-1,$$

$\{x_r\}$ includes an element $x_0, x_1, \ldots, x_{K-1}$ and is an original frequency domain base sequence.

Corresponding to the descriptions for the time domain, when $\beta_2 - \beta_1$ is not equal to 0, cross-correlation between the third sequence and the fourth sequence is 0. Therefore, sequences obtained by performing different phase rotation on a same frequency domain base sequence are orthogonal.

Next, periodic repetition and phase rotation are performed on each of the third sequence $\{c_r\}$ and the fourth sequence $\{d_r\}$, to obtain a first sequence $\{a_i\}$ including an element $a_0, a_1, \ldots, a_{M-1}$ and a second sequence $\{b_i\}$ including an element $b_0, b_1, \ldots, b_{M-1}$.

Using that M=2K as an example, a first sequence $\{d_r\}$ having a length of 2K is obtained by performing periodic repetition and phase rotation on the third sequence $\{c_r\}$ having a length of K, where $$a_i = c_{i \bmod K} \times e^{ji\theta_1}, \theta_1 = \frac{2\pi}{2K}u = \frac{2\pi}{M}u$$

$$i = 0, 1, \ldots 2K-1,$$

where $u \in \{0,1\}$.

Similarly, a second sequence $\{b_i\}$ having a length of 2K is obtained by performing periodic repetition and phase rotation on the fourth sequence $\{d_r\}$ having a length of K, where $$b_i = d_{i \bmod K} \times e^{ji\theta_2}, \theta_2 = \frac{2\pi}{2K}v = \frac{2\pi}{M}v$$

$$i = 0, 1, \ldots 2K-1,$$

where $v \star \{0,1\}$.

In this embodiment of the present invention, the first sequence and the second sequence are code division-orthogonal, but the third sequence and the fourth sequence may be code division-orthogonal or may not be code division-orthogonal. Similar to analysis for the time domain, when a particular condition is satisfied, results obtained by performing a modulo operation on the phase rotation of the third sequence and the fourth sequence by using K are allowed to be the same. For example, the third sequence and the fourth sequence may be a same base sequence. When the first sequence is obtained by performing the periodic repetition on the third sequence, and the second sequence is obtained by performing the periodic repetition on the fourth sequence, a proper extension manner is used (for example, performing periodic repetition and different phase rotation on a same base sequence) to cause the first sequence and the second sequence to be code division-orthogonal.

Correspondingly, the first sequence is $a_0, a_1, \ldots, a_{M-1}$, a frequency domain sequence corresponding to the seventh sequence is the third sequence $c_0, c_1, \ldots, c_{K-1}$ having a length of K, the first sequence is obtained by extending the third sequence, the second sequence is $b_0, b_1, \ldots, b_{M-1}$, a frequency domain sequence corresponding to the eighth sequence is the fourth sequence $d_0, d_1, \ldots, d_{K-1}$ having a length of K, and the second sequence is obtained by extending the fourth sequence, where M=p×K, $$a_i = c_{i \bmod K} \times e^{j\frac{2\pi i u}{M}}, \; b_i = d_{i \bmod K} \times e^{j\frac{2\pi i v}{M}},$$

i is a variable, a value of i is $0, 1, \ldots, M-1$, u and v each are one of $0, 1, \ldots, p-1$, and v is not equal to u.

Next, the third sequence $\{c_r\}$ and the fourth sequence $\{d_r\}$ are mapped to M same subcarriers. The transmit end performs transform such as IFFT on elements on the M subcarriers, to be specific, after zero is added to two ends of a frequency domain signal, generates a signal in time domain, namely, a to-be-sent signal, and transmits the to-be-sent signal by using an antenna.

It can be learned from the foregoing descriptions that, from the perspective of only the frequency domain, a signal transmission method includes: mapping, by a transmit end to M evenly spaced subcarriers, a first sequence $a_0, a_1, \ldots, a_{M-1}$ including M elements, and mapping, to the M subcarriers, a second sequence $b_0, b_1, \ldots, b_{M-1}$ including M elements, where the M subcarriers are subcarriers on a same time domain symbol, the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, where M=p×K, $$a_i = c_{i \bmod K} \times e^{j\frac{2\pi i u}{M}}, \; b_i = d_{i \bmod K} \times e^{j\frac{2\pi i v}{M}},$$

i is a variable, a value of i is $0, 1, \ldots, M-1$, u and v each are one of $0, 1, \ldots, p-1$, v is not equal to u, and M, p, and K are all positive integers; generating, by the transmit end, a to-be-sent signal based on elements on the M subcarriers; and sending, by the transmit end, the to-be-sent signal.

According to the signal transmission method provided in this embodiment of the present invention, two sequences that are code division-orthogonal are constructed through periodic repetition and phase rotation (where in the two equations:

$$a_i = c_{i \bmod K} \times e^{j\frac{2\pi i u}{M}} \text{ and } b_i = d_{i \bmod K} \times e^{j\frac{2\pi i v}{M}},$$

a part on the right side of an equal sign and before a multiplication sign indicates a periodic repetition operation, and a part after the multiplication sign indicates a phase rotation operation), to ensure a relatively low PAPR in signal transmission when at least two signals are transmitted on one symbol, without reducing code resource utilization, thereby improving performance of an up link.

To obtain the first sequence and the second sequence that are code division-orthogonal, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $$c_r = x_r \times e^{j\frac{2\pi r \beta_1}{K}}, \; d_r = x_r \times e^{j\frac{2\pi r \beta_2}{K}},$$

r is a variable, a value of r is $0, 1, \ldots, K-1$, and $\beta_1$ and $\beta_2$ each are one of $0, 1, \ldots, K-1$.

The cyclic shifts are performed on the base sequence, to obtain two sequences that are code division-orthogonal (when $\beta_1$ is not equal to $\beta_2$), namely, the third sequence and the fourth sequence, and periodic repetition and phase rotation are performed on the third sequence and the fourth sequence, to construct the first sequence and the second sequence that are code division-orthogonal. $\beta_1$ may alternatively be equal to $\beta_2$. When $\beta_1$ is equal to $\beta_2$, because v is not equal to u can still be ensured that the third sequence and the fourth sequence are code division-orthogonal.

Because two signals are both sent on the M subcarriers on the same time domain symbol, the transmit end needs to notify the receive end of related information of cyclic shifts for the two signals, for decoding by the receive end.

Therefore, the method may further include: sending, by the transmit end, first signaling, where the first signaling includes first cyclic shift parameter information of the first sequence, and the first cyclic shift parameter information is related to u and $\beta_1$; and sending, by the transmit end, second signaling, where the second signaling includes second cyclic shift parameter information of the second sequence, and the second cyclic shift parameter information is related to v and $\beta_2$.

In another more common solution of this embodiment of the present invention, the third sequence $c_0, c_1, \ldots, c_{K-1}$ and the fourth sequence $d_0, d_1, \ldots, d_{K-1}$ may be sequences obtained by performing cyclic shifts on a same base sequence $x_0, x_1, \ldots, x_{K-1}$, where $c_r = x_r \times e^{j 2\pi r \alpha_1}$, $d_r = x_r \times e^{j 2\pi r \alpha_2}$, r is a variable, a value of r is $0, 1, \ldots, K-1$, and $\alpha_1$ and $\alpha_2$ each are any real number.

To be specific, the third sequence and the fourth sequence may be indicated as sequences in the following forms, namely, $c_r = x_r \times e^{j 2\pi r \alpha_1}$ and $d_r = x_r \times e^{j 2\pi r \alpha_2}$, where r is a variable, a value of r is $0, 1, \ldots, K-1$, and $\alpha_1$ and $\alpha_2$ may be any real number. For example, $$\alpha_1 = \frac{\lambda_1}{q_1 K}, \text{ and } \alpha_2 = \frac{\lambda_2}{q_2 K},$$

where values of $\lambda_1$ and $\lambda_2$ are respectively $0, 1, \ldots, q_1 K - 1$ and $0, 1, \ldots, q_2 K - 1$, so that values of $\alpha_1$ and $\alpha_2$ are respectively $$0, \frac{1}{q_1 K}, \frac{2}{q_1 K}, \ldots, \frac{q_1 K - 1}{q_1 K} \text{ and } 0, \frac{1}{q_2 K}, \frac{2}{q_2 K}, \ldots, \frac{q_2 K - 1}{q_2 K}.$$

The values of $\alpha_1$ and $\alpha_2$ are described above by using an example. Values of $q_1$ and $q_2$ are not limited, and each may be any real number such as 1, 2, or p.

In an optional solution, when $q_1$ and $q_2$ are equal to p, $$\alpha_1 = \frac{\lambda_1}{qK}, \text{ and } \alpha_2 = \frac{\lambda_2}{qK},$$

where $\lambda_1$ and $\lambda_2$ each are any one of $0, 1, \ldots pK-1$. $\lambda_1$ may be equal to or not equal to $\lambda_2$. This is not limited in this embodiment of the present invention.

Similarly, the method may further include: sending, by the transmit end, first signaling, where the first signaling includes first cyclic shift parameter information of the first sequence, and the first cyclic shift parameter information is related to u and $\alpha_1$; and sending, by the transmit end, second signaling, where the second signaling includes second cyclic shift parameter information of the second sequence, and the second cyclic shift parameter information is related to v and $\alpha_2$.

It should be understood that, the first signaling and the second signaling may be sent to a same receive end, or may be sent to different receive ends. The first signaling is sent to a receive end receiving the first sequence, and the second signaling is sent to a receive end receiving the second sequence. The first signaling and the second signaling may be combined into a same message and sent, or may be separately sent. When the first signaling and the second signaling are sent to a same receive end, in an embodiment, the first signaling and the second signaling may be combined into a same message and sent. This is not limited in this embodiment of the present invention.

Specifically, $$c_r = x_r \times e^{j\frac{2\pi r \beta_1}{K}}$$

may be substituted into $$a_i = c_{i \bmod K} \times e^{j\frac{2\pi i u}{M}},$$

to obtain:

$$\begin{aligned} a_i &= c_{i \bmod K} \times e^{j\frac{2\pi i u}{M}} \\ &= x_{i \bmod K} \times e^{j\frac{2\pi (i \bmod K)\beta_i}{K}} \times e^{j\frac{2\pi i u}{M}} \\ &= x_{i \bmod K} \times e^{j\frac{2\pi i p \beta_1}{pK}} \times e^{j\frac{2\pi i u}{M}} \\ &= x_{i \bmod K} \times e^{j\frac{2\pi i p \beta_1}{M}} \times e^{j\frac{2\pi i u}{M}} \\ &= x_{i \bmod K} \times e^{j\frac{2\pi i(p\beta_1+u)}{M}} \end{aligned}$$

Similarly, $$\begin{aligned} b_i &= d_{i \bmod K} \times e^{j\frac{2\pi i v}{M}} \\ &= x_{i \bmod K} \times e^{j\frac{2\pi i(p\beta_2+v)}{M}} \end{aligned}$$

Therefore, the first sequence and the second sequence each having a length of M may be indicated as sequences obtained by performing cyclic shifts on an extension sequence of the base sequence $x_i$. The cyclic shifts are respectively $p\beta_1+u$ and $p\beta_2+v$, and the cyclic shifts may be notified to the receive end such as a terminal device by using signaling (such as the first signaling and the second signaling).

In this embodiment of the present invention, the generating, by the transmit end, a to-be-sent signal based on elements on the M subcarriers may include: mapping, by the transmit end, the first sequence and the second sequence to the M subcarriers, transforming the elements on the M subcarriers to be in time domain, and generating the to-be-sent signal; or adding, by the transmit end, to-be-transmitted information to the first sequence or the second sequence on the M subcarriers, transforming, to be in time domain, elements on which the to-be-transmitted information is carried and that are on the M subcarriers, and generating the to-be-sent signal.

To be specific, in this embodiment of the present invention, the to-be-sent signal may include a reference signal or a data signal carrying to-be-transmitted information. A signal in the present invention may be a modulated signal. When the to-be-sent signal is transmitted on a plurality of antennas, before the elements on the M subcarriers are transformed to be in time domain, spatial precoding (Spatial Precoding) may further be performed, and different signals may have different spatial precoding. It should be understood that, in this embodiment of the present invention, a final result obtained by processing a signal from the perspective of the frequency domain is the same as a final result obtained by processing a signal from the perspective of the time domain.

A principle of processing a sequence from the perspective of the frequency domain and a principle of processing a sequence from the perspective of the time domain in this embodiment of the present invention are described in detail below.

Therefore, inserting zero to an odd-numbered point for the sequence in time domain is equivalent to extension in frequency domain (periodic repetition and phase rotation 1); and inserting zero to an even-numbered point for the sequence in time domain is equivalent to extension in frequency domain (periodic repetition and phase rotation 2). The phase rotation 1 and the phase rotation 2 are different phase rotation.

In various embodiments of the present invention, a sequence may be flexibly extended through zero insertion, periodic repetition, phase rotation, and the like.

It should be understood that, in this embodiment of the present invention, the fifth sequence and the first sequence are respectively a time domain representation and a frequency domain representation of a same sequence; the sixth sequence and the second sequence are respectively a time domain representation and a frequency domain representation of another sequence; the seventh sequence and the third sequence are respectively a time domain representation and a frequency domain representation of a same base sequence; and the eighth sequence and the fourth sequence are respectively a time domain representation and a frequency domain representation of another base sequence. The fifth sequence is a sequence obtained by performing inverse discrete Fourier transform IDFT on the first sequence; the sixth sequence is a sequence obtained by performing IDFT transform on the second sequence; the first sequence is a sequence obtained by performing discrete Fourier transform IDFT on the fifth sequence; and the second sequence is a sequence obtained by performing DFT transform on the sixth sequence.

For a case in which a plurality of signals are carried on the M subcarriers, the signal transmission method in this embodiment of the present invention may further include:

mapping, by the transmit end, to the A/subcarriers, a ninth sequence including M elements, where a time domain sequence corresponding to the ninth sequence is a tenth sequence, elements of any two time domain sequences in the tenth sequence, the fifth sequence, and the sixth sequence at a same position are not both non-zero elements, the tenth sequence is obtained by extending a third base sequence, and any two of a first base sequence, a second base sequence, and the third base sequence are code division-orthogonal.

In this embodiment of the present invention, the base sequence may be a ZC sequence, a cyclic extension sequence of a ZC sequence, a truncated sequence of a ZC sequence, or a reference signal sequence conforming to a standard of a 3rd Generation Partnership Project (3GPP) Long Term Evolution (LTE) system. The cyclic extension sequence of the ZC sequence and the truncated sequence of the ZC sequence are described by using the following example. A length of an uplink reference signal of the LTE system is usually an integer multiple of RB, namely, an integer multiple of 12. However, a ZC sequence used to generate a reference signal is not necessarily an integer multiple of 12. When a length of the ZC sequence is less than a length of the reference signal, a sequence of the reference signal is generated through cyclic extension of the ZC sequence. When a length of the ZC sequence is greater than a length of the reference signal, a sequence of the reference signal is generated by truncating the ZC sequence. For example, the length of the ZC sequence $X_i$ is M, and the length of the reference signal $Y_i$ is N. When M<N, $Y_i = X_{i \bmod M}$, where i=0, 1, ..., N−1; or when M>N, $Y_i = X_i$, where i=0, 1, ..., N−1.

In a specific example, the base sequence may be a ZC sequence (namely, a Zadoff-Chu sequence). The ZC sequence has good correlation, or a good cyclic shift feature. To be specific, any original ZC sequence is not correlated with a sequence obtained by performing a cyclic shift of n bits on the ZC sequence, where a result obtained by performing a modulo operation on n by using a length of the sequence is not zero, to be specific, an auto-correlation peak value is high. The ZC sequence has a good cross-correlation feature, and a cross-correlation value is close to zero. The ZC sequence has a low PAPR. After Fast Fourier Transformation (FFT) or inverse Fast Fourier Transformation (IFFT) is performed on any ZC sequence, the sequence is still a ZC sequence. It should be understood that, other than the ZC sequence, the base sequence may also correspond to another constant amplitude zero auto-correlation (CAZAC) sequence, or the like. The base sequence may alternatively be another sequence having a low PAPR feature. This is not limited in this embodiment of the present invention.

For the receive end, a signal transmission method on a receive end side includes: receiving, by the receive end, a radio frequency signal on M subcarriers, where the A/subcarriers are subcarriers on a same time domain symbol; performing, by the receive end, fast Fourier transformation FFT on the radio frequency signal, to obtain a first to-be-received signal corresponding to a first sequence and a second to-be-received signal corresponding to a second sequence, where a time domain sequence corresponding to the first sequence is a fifth sequence, a time domain sequence corresponding to the second sequence is a sixth sequence, the fifth sequence and the sixth sequence each include M elements, elements of the fifth sequence and the sixth sequence at a same position are not both non-zero elements, and the fifth sequence and the sixth sequence are code division-orthogonal; and performing, by the receive end, signal processing on the first to-be-received signal and the second to-be-received signal.

Features of the first sequence, the second sequence, the fifth sequence, the sixth sequence, the third sequence, the fourth sequence, the seventh sequence, and the eighth sequence are the same as the corresponding sequences of the transmit end described above, and details are not described herein again.

The signal processing in this embodiment of the present invention may specifically include equalization, IDFT, and the like for a data signal, and may specifically include channel estimation and the like for a reference signal.

Correspondingly, the performing, by the receive end, signal processing on the first to-be-received signal and the second to-be-received signal may include: performing, by the receive end, inverse discrete Fourier transform (IDFT) on the first to-be-received signal, to obtain the fifth sequence corresponding to the first sequence; and/or performing, by the receive end, inverse discrete Fourier transform IDFT on the second to-be-received signal, to obtain the sixth sequence corresponding to the second sequence.

When the first to-be-received signal or the second to-be-received signal is a data signal, for example, a physical downlink shared channel (PDSCH), the signal processing further includes performing an equalization operation on the data signal.

Corresponding to the transmit end, in addition to the two signals described above, the receive end performs fast Fourier transformation FFT on the radio frequency signal, to obtain a third to-be-received signal corresponding to a ninth sequence. A time domain sequence corresponding to the ninth sequence is a tenth sequence, elements of any two time domain sequences in the tenth sequence, the fifth sequence, and the sixth sequence at a same position are not both non-zero elements, and any two time domain sequences in the fifth sequence, the sixth sequence, and the tenth sequence are code division-orthogonal. The receive end performs signal processing on the third to-be-received signal.

From the perspective of the frequency domain, this embodiment of the present invention provides a signal transmission method. The method includes: receiving, by a receive end, a signal on M evenly spaced subcarriers, where the M subcarriers are subcarriers on a same time domain symbol; performing, by the receive end, fast Fourier transformation FFT on the signal, to obtain a first to-be-received signal corresponding to a first sequence $a_0, a_1, \ldots, a_{M-1}$, and a second to-be-received signal corresponding to a second sequence $b_0, b_1, \ldots, b_{M-1}$, where the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, where M=p×K, $$a_i = c_{i \bmod K} \times e^{j\frac{2\pi i u}{M}}, b_i = d_{i \bmod K} \times e^{j\frac{2\pi i v}{M}},$$

i is a variable, a value of i is 0, 1, ..., M−1, u and v each are one of 0, 1, ..., p−1, v is not equal to u, and M, p, and K are all positive integers; and performing, by the receive end, signal processing on the first to-be-received signal and the second to-be-received signal.

In an embodiment, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $$c_r = x_r \times e^{j\frac{2\pi r \beta_1}{K}}, d_r = x_r \times e^{j\frac{2\pi r \beta_2}{K}},$$

r is a variable, a value of r is 0, 1, ..., K−1, and $\beta_1$ and $\beta_2$ each are one of 0, 1, ..., K−1.

In this embodiment of the present invention, the method on the receive end side may further include: receiving, by the receive end, first signaling, where the first signaling includes first cyclic shift parameter information of the first sequence, and the first cyclic shift parameter information is related to u and $\beta_1$; and receiving, by the receive end, second signaling, where the second signaling includes second cyclic shift parameter information of the second sequence, and the second cyclic shift parameter information is related to v and $\beta_2$. The receive end may parse data based on the cyclic shift parameter information.

In another embodiment, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $c_r = x_r \times e^{j2\pi r\alpha_1}$, $d_r = x_r \times e^{j2\pi r\alpha_2}$, r is a variable, a value of r is 0, 1, ..., K−1, and $\alpha_1$ and $\alpha_2$ each are any real number.

Optionally, values of $\alpha_1$ and $\alpha_2$ may be that $$\alpha_1 = \frac{\lambda_1}{pK}, \text{ and } \alpha_2 = \frac{\lambda_2}{pK},$$

where $\lambda_1$ and $\lambda_2$ each are any one of 0, 1, ..., pK−1.

In this embodiment of the present invention, the method may further include: receiving, by the receive end, first signaling, where the first signaling includes first cyclic shift parameter information of the first sequence, and the first cyclic shift parameter information is related to u and $\alpha_1$; and receiving, by the receive end, second signaling, where the second signaling includes second cyclic shift parameter information of the second sequence, and the second cyclic shift parameter information is related to v and $\alpha_2$.

The signal transmission method in this embodiment of the present invention is described in detail above with reference to FIG. 1 to FIG. 6, and a transmit end and a receive end in embodiments of the present invention are separately described below.

Figure 7:
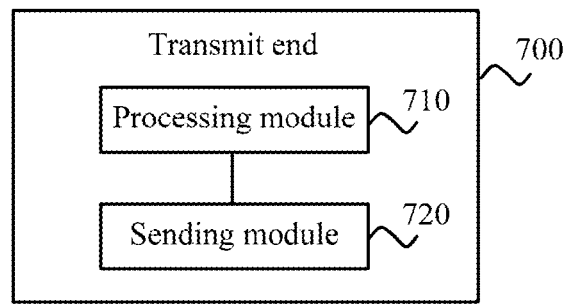
FIG. 7 is a schematic block diagram of a transmit end according to an embodiment of the present invention.

FIG. 7 shows a transmit end 700 in an embodiment of the present invention. The transmit end 700 includes:

a processing module 710, configured to: map, to M evenly spaced subcarriers, a first sequence including M elements, and map, to the M subcarriers, a second sequence including M elements, where the first sequence is a Fourier transform sequence of a fifth sequence, the second sequence is a Fourier transform sequence of a sixth sequence, the fifth sequence and the sixth sequence each include M elements, elements of the fifth sequence and the sixth sequence at a same position are not both non-zero elements, and the fifth sequence and the sixth sequence are code division-orthogonal, where the processing module 710 is further configured to generate a to-be-sent signal based on elements on the M subcarriers; and a sending module 720, configured to send the to-be-sent signal generated by the processing module.

The transmit end in this embodiment of the present invention constructs two sequences that are code division-orthogonal in time domain, and elements of the two sequences at a same position are not both non-zero elements, to ensure a relatively low PAPR in signal transmission when at least two signals are transmitted on one symbol, without reducing code resource utilization, thereby improving performance of an up link.

Optionally, in an embodiment, the fifth sequence is obtained by extending a seventh sequence, the sixth sequence is obtained by extending an eighth sequence, and the seventh sequence and the eighth sequence are code division-orthogonal.

Optionally, in an embodiment, the seventh sequence and the eighth sequence are sequences obtained by performing different cyclic shifts on a same base sequence.

Optionally, in an embodiment, the first sequence is $a_0, a_1, \ldots, a_{M-1}$, a frequency domain sequence corresponding to the seventh sequence is a third sequence $c_0, c_1, \ldots, c_{K-1}$ having a length of K, and the first sequence is obtained by extending the third sequence; and the second sequence is $b_0, b_1, \ldots, b_{M-1}$, a frequency domain sequence corresponding to the eighth sequence is a fourth sequence $d_0, d_1, \ldots, d_{K-1}$ having a length of K, and the second sequence is obtained by extending the fourth sequence, where $M = p \times K$, $$a_i = c_{i \bmod K} \times e^{j\frac{2\pi i u}{M}}, \quad b_i = d_{i \bmod K} \times e^{j\frac{2\pi i v}{M}},$$

i is a variable, a value of i is 0, 1, ..., M−1, u and v each are one of 0, 1, ..., p−1, and v is not equal to u.

Optionally, in an embodiment, before the processing module 710 maps, to the M evenly spaced subcarriers, the first sequence including the M elements, the processing module 710 is further configured to:

perform first transform on the fifth sequence, to obtain the first sequence, where the first transform is M×M discrete Fourier transform DFT; and/or before the processing module 710 maps, to the M subcarriers, the second sequence including the M elements, the processing module 710 is further configured to:

perform second transform on the sixth sequence, to obtain the second sequence, where the second transform is M×M DFT.

Optionally, in an embodiment, the processing module 710 is specifically configured to:

determine the fifth sequence, where the fifth sequence $f_0, f_1, \ldots, f_{M-1}$ is obtained by extending the seventh sequence $h_0, h_1, \ldots, h_{K-1}$ having a length of K, the seventh sequence $h_0, h_1, \ldots, h_{K-1}$ is evenly spaced in the fifth sequence $f_0, f_1, \ldots, f_{M-1}$, a gap is p, where $M = p \times K$, and an element other than K elements $h_0, h_1, \ldots, h_{K-1}$ in the seventh sequence in the fifth sequence $f_0, f_1, \ldots, f_{M-1}$ is a zero element;

perform the M×M DFT on the fifth sequence, and map the fifth sequence to the M subcarriers;

determine the sixth sequence, where the sixth sequence $g_0, g_1, \ldots, g_{M-1}$ is obtained by extending the eighth sequence $j_0, j_1, \ldots, j_{K-1}$ having a length of K, the eighth sequence $j_0, j_1, \ldots, j_{K-1}$ is evenly spaced in the sixth sequence $g_0, g_1, \ldots, g_{M-1}$, a gap is p, where $M = p \times K$, and an element other than K elements $j_0, j_1, \ldots, j_{K-1}$ in the eighth sequence in the sixth sequence $g_0, g_1, \ldots, g_{M-1}$ is a zero element; and perform the M×M DFT on the sixth sequence, and map the sixth sequence to the M sub carriers.

Optionally, in an embodiment, the processing module 710 is further configured to:

map, to the M subcarriers, a ninth sequence including M elements, where the ninth sequence is a Fourier transform sequence of a tenth sequence, elements of any two time domain sequences in the tenth sequence, the fifth sequence, and the sixth sequence at a same position are not both non-zero elements, and any two time domain sequences in the fifth sequence, the sixth sequence, and the tenth sequence are code division-orthogonal.

Optionally, in an embodiment, non-zero elements of the fifth sequence are evenly spaced; and/or non-zero elements of the sixth sequence are evenly spaced.

Optionally, in an embodiment, the base sequence is a ZC sequence, a cyclic extension sequence of a ZC sequence, a truncated sequence of a ZC sequence, or a reference signal sequence conforming to a standard of a 3rd Generation Partnership Project (3GPP) Long Term Evolution (LTE) system.

Optionally, in an embodiment, the fifth sequence is a sequence obtained by performing an inverse discrete Fourier transform (IDFT) on the first sequence, and the sixth sequence is a sequence obtained by performing an IDFT transform on the second sequence.

When considered only from a perspective of a frequency domain, the transmit end 700 in this embodiment of the present invention may be used to implement the following content.

The processing module 710 is configured to: map, to M evenly spaced subcarriers, a first sequence $a_0, a_1, \ldots, a_{M-1}$ including M elements, and map, to the M subcarriers, a second sequence $b_0, b_1, \ldots, b_{M-1}$ including M elements, where the M subcarriers are subcarriers on a same time domain symbol, the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, where M=p×K, $$a_i = c_{i \bmod K} \times e^{j\frac{2\pi i u}{M}}, b_i = d_{i \bmod K} \times e^{j\frac{2\pi i v}{M}},$$

i is a variable, a value of i is 0, 1, . . . , M−1, u and v each are one of 0, 1, . . . , p−1, v is not equal to u, and M, p, and K are all positive integers.

The processing module 710 is further configured to generate a to-be-sent signal based on elements on the M subcarriers.

The sending module 720 is configured to send the to-be-sent signal generated by the processing module.

Optionally, in an embodiment, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $c_r = x_r \times e^{j2\pi r \alpha_1}$, $d_r = x_r \times e^{j2\pi r \alpha_2}$, r is a variable, a value of r is 0, 1, . . . , K−1, and $\alpha_1$ and $\alpha_2$ each are any real number.

Optionally, in an embodiment, $$\alpha_1 = \frac{\lambda_1}{pK}, \text{ and } \alpha_2 = \frac{\lambda_2}{pK},$$

where $\lambda_1$ and $\lambda_2$ each are any one of 0, 1, . . . , pK−1.

Optionally, in an embodiment, the sending module 720 may further be configured to: send first signaling, where the first signaling includes first cyclic shift parameter information of the first sequence, and the first cyclic shift parameter information is related to u and $\alpha_1$; and send second signaling, where the second signaling includes second cyclic shift parameter information of the second sequence, and the second cyclic shift parameter information is related to v and $\alpha_2$.

Optionally, in an embodiment, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $$c_r = x_r \times e^{j\frac{2\pi r \beta_1}{K}}, d_r = x_r \times e^{j\frac{2\pi r \beta_2}{K}},$$

r is a variable, a value of r is 0, 1, . . . , K−1, and $\beta_1$ and $\beta_2$ each are one of 0, 1, . . . , K−1.

Optionally, in an embodiment, the sending module 720 is further configured to:

send first signaling, where the first signaling includes first cyclic shift parameter information of the first sequence, and the first cyclic shift parameter information is related to u and $\beta_1$; and send second signaling, where the second signaling includes second cyclic shift parameter information of the second sequence, and the second cyclic shift parameter information is related to v and $\beta_2$.

Optionally, in an embodiment, the generating, by the processing module 710, a to-be-sent signal based on elements on the M subcarriers includes:

adding to-be-transmitted information to the M subcarriers, and transforming, to be in time domain, elements on which the to-be-transmitted information is carried and that are on the M subcarriers, to generate the to-be-sent signal.

Optionally, in an embodiment, the base sequence is a ZC sequence, a cyclic extension sequence of a ZC sequence, a truncated sequence of a ZC sequence, or a reference signal sequence conforming to a standard of a 3rd Generation Partnership Project (3GPP) Long Term Evolution (LTE) system.

Figure 8:
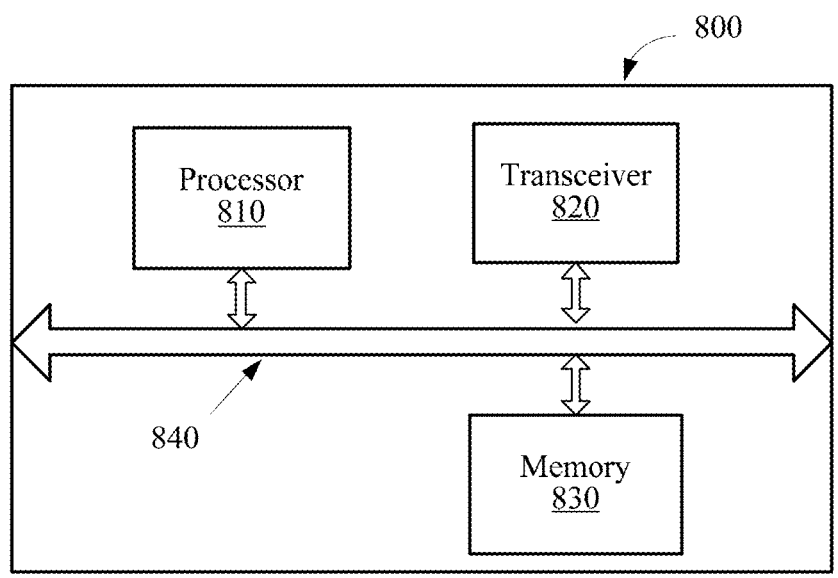
FIG. 8 is a schematic block diagram of a transmit end according to another embodiment of the present invention.

It should be noted that, in this embodiment of the present invention, the processing module 710 may be implemented by a processor, and the sending module 720 may be implemented by a transceiver. As shown in FIG. 8, a transmit end 800 may include a processor 810, a transceiver 820, and a memory 830. The memory 830 may be configured to store code to be executed by the processor 810, and the like.

The components of the transmit end 800 are coupled together by using a bus system 840, and in addition to including a data bus, the bus system 840 includes a power bus, a control bus, and a state signal bus.

The transmit end 700 shown in FIG. 7 or the transmit end 800 shown in FIG. 8 can implement the processes implemented in the embodiments in FIG. 1 to FIG. 6. To avoid repetition, details are not described herein again.

It should be noted that the foregoing method embodiments of the present invention may be applied to a processor, or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may further be a general processor, a digital signal processor (DSP), an application-specific integrated circuit (ASIC), a field programmable gate array (FPGA), another programmable logic device, a discrete gate, a transistor logic device, or a discrete hardware component. All methods, steps, and logical block diagrams disclosed in this embodiment of the present invention may be implemented or performed. The general purpose processor may be a microprocessor or the processor may be any conventional processor, or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

Figure 9:
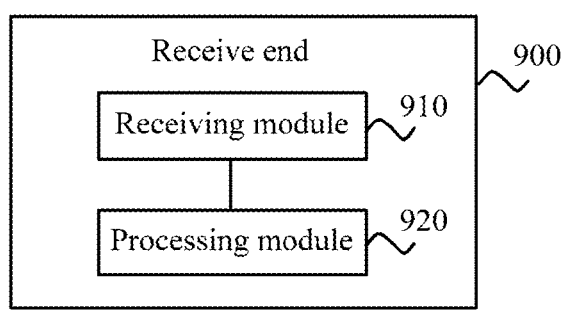
FIG. 9 is a schematic block diagram of a receive end according to an embodiment of the present invention.

FIG. 9 shows a receive end 900 in an embodiment of the present invention. The receive end 900 includes:

a receiving module 910, configured to receive a signal on M evenly spaced subcarriers, where the M subcarriers are subcarriers on a same time domain symbol; and a processing module 920, configured to perform fast Fourier transformation FFT on the signal received by the receiving module 910, to obtain a first to-be-received signal corresponding to a first sequence and a second to-be-received signal corresponding to a second sequence, where the first sequence is a Fourier transform sequence of a fifth sequence, the second sequence is a Fourier transform sequence of a sixth sequence, the fifth sequence and the sixth sequence each include M elements, elements of the fifth sequence and the sixth sequence at a same position are not both non-zero elements, and the fifth sequence and the sixth sequence are code division-orthogonal.

The processing module 910 is further configured to perform signal processing on the first to-be-received signal and the second to-be-received signal.

Two sequences corresponding to two signals that are received by the receive end in this embodiment of the present invention on one symbol are code division-orthogonal, and elements of the two sequences at a same position are not both non-zero elements, to be specific, PAPRs of at least two signals received on one symbol are relatively low.

Optionally, in an embodiment, the fifth sequence is obtained by extending a seventh sequence, the sixth sequence is obtained by extending an eighth sequence, and the seventh sequence and the eighth sequence are code division-orthogonal.

Optionally, in an embodiment, the seventh sequence and the eighth sequence are sequences obtained by performing different cyclic shifts on a same base sequence.

Optionally, in an embodiment, the first sequence is $a_0, a_1, \ldots, a_{M-1}$ a frequency domain sequence corresponding to the seventh sequence is a third sequence $c_0, c_1, \ldots, c_{K-1}$ having a length of K, and the first sequence is obtained by extending the third sequence; and the second sequence is $b_0, b_1, \ldots, b_{M-1}$, a frequency domain sequence corresponding to the eighth sequence is a fourth sequence $d_0, d_1, \ldots, d_{K-1}$ having a length of K, and the second sequence is obtained by extending the fourth sequence, where $M = p \times K$, $$a_i = c_{i \bmod K} \times e^{j\frac{2\pi i u}{M}}, b_i = d_{i \bmod K} \times e^{j\frac{2\pi i v}{M}},$$

i is a variable, a value of i is $0, 1, \ldots, M-1$, u and v each are one of $0, 1, \ldots, p-1$, and v is not equal to u.

Optionally, in an embodiment, the fifth sequence $f_0, f_1, \ldots, f_{M-1}$ is obtained by extending the seventh sequence $h_0, h_1, \ldots, h_{K-1}$ having a length of K, the seventh sequence $h_0, h_1, \ldots, h_{K-1}$ is evenly spaced in the fifth sequence $f_0, f_1, \ldots, f_{M-1}$ a gap is p, where $M = p \times K$, and an element other than K elements $h_0, h_1, \ldots, h_{K-1}$ in the seventh sequence in the fifth sequence $f_0, f_1, \ldots, f_{M-1}$ is a zero element; and the sixth sequence $g_0, g_1, \ldots, g_{M-1}$ is obtained by extending the eighth sequence $j_0, j_1, \ldots, j_{K-1}$ having a length of K, the eighth sequence $j_0, j_1, \ldots, j_{K-1}$ is evenly spaced in the sixth sequence $g_0, g_1, \ldots, g_{M-1}$, a gap is p, where $M = p \times K$, and an element other than K elements $j_0, j_1, \ldots, j_{K-1}$ in the eighth sequence in the sixth sequence $g_0, g_1, \ldots, g_{M-1}$ is a zero element.

Optionally, in an embodiment, the processing module 920 is further configured to:

perform fast Fourier transformation FFT on the signal, to obtain a third to-be-received signal corresponding to a ninth sequence, where the ninth sequence is a Fourier transform sequence of a tenth sequence, elements of any two time domain sequences in the tenth sequence, the fifth sequence, and the sixth sequence at a same position are not both non-zero elements, and any two time domain sequences in the fifth sequence, the sixth sequence, and the tenth sequence are code division-orthogonal; and perform signal processing on the third to-be-received signal.

Optionally, in an embodiment, non-zero elements of the fifth sequence are evenly spaced; and/or non-zero elements of the sixth sequence are evenly spaced.

Optionally, in an embodiment, the base sequence is a ZC sequence, a cyclic extension sequence of a ZC sequence, a truncated sequence of a ZC sequence, or a reference signal sequence conforming to a standard of a 3rd Generation Partnership Project 3GPP Long Term Evolution LTE system.

Optionally, in an embodiment, the fifth sequence is a sequence obtained by performing an inverse discrete Fourier transform (IDFT) on the first sequence, and the sixth sequence is a sequence obtained by performing an IDFT transform on the second sequence.

Optionally, in an embodiment, the processing module 920 is specifically configured to:

perform inverse discrete Fourier transform (IDFT) on the first to-be-received signal, to obtain the fifth sequence; and/or perform inverse discrete Fourier transform (IDFT) on the second to-be-received signal, to obtain the sixth sequence.

When considered only from a perspective of a frequency domain, the receive end 900 in this embodiment of the present invention may be used to implement the following content.

The receiving module 910 is configured to receive a signal on M evenly spaced subcarriers, where the M subcarriers are subcarriers on a same time domain symbol.

The processing module 920 is configured to perform fast Fourier transformation FFT on the signal received by the receiving module 910, to obtain a first to-be-received signal corresponding to a first sequence $a_0, a_1, \ldots, a_{M-1}$ and a second to-be-received signal corresponding to a second sequence $b_0, b_1, \ldots, b_{M-1}$ where the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, where M=p×K, $$a_i = c_{i \bmod K} \times e^{j\frac{2\pi i u}{M}}, b_i = d_{i \bmod K} \times e^{j\frac{2\pi i v}{M}},$$

i is a variable, a value of i is 0, 1, . . . , M−1, u and v each are one of 0, 1, . . . , p−1, v is not equal to u, and M, p, and K are all positive integers.

The processing module 920 is further configured to perform signal processing on the first to-be-received signal and the second to-be-received signal.

Optionally, in an embodiment, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $c_r = x_r \times e^{j2\pi r \alpha_1}$, $d_r = x_r \times e^{j2\pi r \alpha_2}$, r is a variable, a value of r is 0, 1, . . . , K−1, and $\alpha_1$ and $\alpha_2$ each are any real number.

Optionally, in an embodiment, $$\alpha_1 = \frac{\lambda_1}{pK}, \text{ and } \alpha_2 = \frac{\lambda_2}{pK},$$

where $\lambda_1$ and $\lambda_2$ each are any one of 0, 1, . . . , pK−1.

Optionally, in an embodiment, the receiving module 910 may further be configured to: receive first signaling, where the first signaling includes first cyclic shift parameter information of the first sequence, and the first cyclic shift parameter information is related to u and $\alpha_1$; and receive second signaling, where the second signaling includes second cyclic shift parameter information of the second sequence, and the second cyclic shift parameter information is related to v and $\alpha_2$.

Optionally, in an embodiment, the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, where $$c_r = x_r \times e^{j\frac{2\pi r \beta_1}{K}}, d_r = x_r \times e^{j\frac{2\pi r \beta_2}{K}},$$

r is a variable, a value of r is 0, 1, . . . , K−1, and $\beta_1$ and $\beta_2$ each are one of 0, 1, . . . , K−1.

Optionally, in an embodiment, the receiving module 910 may further be configured to:

receive first signaling, where the first signaling includes first cyclic shift parameter information of the first sequence, and the first cyclic shift parameter information is related to u and $\beta_1$; and receive second signaling, where the second signaling includes second cyclic shift parameter information of the second sequence, and the second cyclic shift parameter information is related to v and $\beta_2$.

Optionally, in an embodiment, the base sequence is a ZC sequence, a cyclic extension sequence of a ZC sequence, a truncated sequence of a ZC sequence, or a reference signal sequence conforming to a standard of a 3rd Generation Partnership Project (3GPP) Long Term Evolution (LTE) system.

Figure 10:
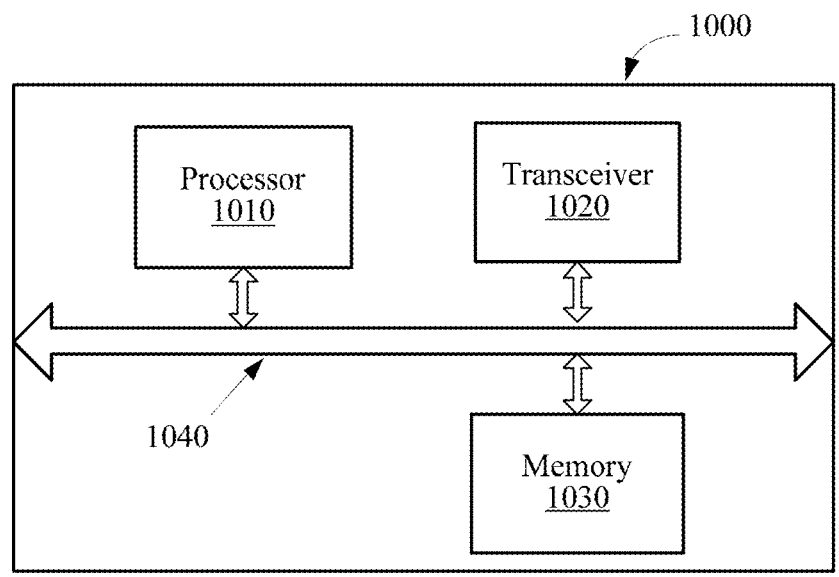
FIG. 10 is a schematic block diagram of a receive end according to another embodiment of the present invention.

It should be noted that, in this embodiment of the present invention, the receiving module 910 may be implemented by a transceiver, and the processing module 920 may be implemented by a processor. As shown in FIG. 10, a receive end 1000 may include a processor 1010, a transceiver 1020, and a memory 1030. The memory 1030 may be configured to store code to be executed by the processor 1010, and the like.

The components of the receive end 1000 are coupled together by using a bus system 1040, and in addition to including a data bus, the bus system 1040 includes a power bus, a control bus, and a state signal bus.

The receive end 900 shown in FIG. 9 or the receive end 1000 shown in FIG. 10 can implement the processes implemented in the embodiments in FIG. 1 to FIG. 6. To avoid repetition, details are not described herein again.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
   mapping, by a transmit end to M evenly spaced subcarriers, a first sequence $a_0, a_1, \ldots, a_{M-1}$ comprising M elements, and mapping, to the M subcarriers, a second sequence $b_0, b_1, \ldots, b_{M-1}$ comprising M elements, wherein the M subcarriers are subcarriers on a same time domain symbol, the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, wherein M=p×K, $$a_i = c_{i \bmod K} \times e^{j\frac{2\pi i u}{M}}, \quad b_i = d_{i \bmod K} \times e^{j\frac{2\pi i v}{M}},$$

i is a variable, a value of i is $0, 1, \ldots, M-1$, u and v each are one of $0, 1, \ldots, p-1$, v is not equal to u, and M, p, and K are all positive integers;
   generating, by the transmit end, a to-be-sent signal based on elements on the M subcarriers; and
   sending, by the transmit end, the to-be-sent signal,
   wherein the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$,
   wherein:

$$c_r = x_r \times e^{j\frac{2\pi r \beta_1}{K}}, \quad d_r = x_r \times e^{j\frac{2\pi r \beta_2}{K}},$$

r is a variable, a value of r is $0, 1, \ldots, K-1$, and $\beta_1$ and $\beta_2$ each are one of $0, 1, \ldots, K-1$; or
   $c_r = x_r \times e^{j2\pi r \alpha_1}$, $d_r = x_r \times e^{j2\pi r \alpha_2}$, r is a variable, a value of r is $0, 1, \ldots, K-1$, and $\alpha_1$ and $\alpha_2$ each are any real number.

2. A signal transmission method, comprising:
   receiving, by a receive end, a signal on M evenly spaced subcarriers, wherein the M subcarriers are subcarriers on a same time domain symbol;
   performing, by the receive end, Fast Fourier Transformation (FFT) on the signal, to obtain a first to-be-received signal corresponding to a first sequence $a_0, a_1, \ldots, a_{M-1}$ and a second to-be-received signal corresponding to a second sequence $b_0, b_1, \ldots, b_{M-1}$, wherein the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, wherein M=p×K, $$a_i = c_{i \bmod K} \times e^{j\frac{2\pi i u}{M}}, \quad b_i = d_{i \bmod K} \times e^{j\frac{2\pi i v}{M}},$$

i is a variable, a value of i is $0, 1, \ldots, M-1$, u and v each are one of $0, 1, \ldots, p-1$, v is not equal to u, and M, p, and K are all positive integers; and
   performing, by the receive end, signal processing on the first to-be-received signal and the second to-be-received signal,
   wherein the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$,
   wherein:

$$c_r = x_r \times e^{j\frac{2\pi r \beta_1}{K}}, \quad d_r = x_r \times e^{j\frac{2\pi r \beta_2}{K}},$$

r is a variable, a value of r is $0, 1, \ldots, K-1$, and $\beta_1$ and $\beta_2$ each are one of $0, 1, \ldots, K-1$; or
   $c_r = x_r \times e^{j2\pi r \alpha_1}$, $d_r = x_r \times e^{j2\pi r \alpha_2}$, r is a variable, a value of r is $0, 1, \ldots, K-1$, and $\alpha_1$ and $\alpha_2$ each are any real number.

3. The method according to claim 2, wherein when $$c_r = x_r \times e^{j\frac{2\pi r \beta_1}{K}}, \quad d_r = x_r \times e^{j\frac{2\pi r \beta_2}{K}},$$

r is a variable, a value of r is $0, 1, \ldots, K-1$, and $\beta_1$ and $\beta_2$ each are one of $0, 1, \ldots, K-1$, the method further comprises:
   receiving, by the receive end, first signaling, wherein the first signaling comprises first cyclic shift parameter information of the first sequence, and the first cyclic shift parameter information is related to u and $\beta_1$; and
   receiving, by the receive end, second signaling, wherein the second signaling comprises second cyclic shift parameter information of the second sequence, and the second cyclic shift parameter information is related to v and $\beta_2$.

4. The method according to claim 2, wherein when $c_r = x_r \times e^{j2\pi r \alpha_1}$, $d_r = x_r \times e^{j2\pi r \alpha_2}$, r is a variable, a value of r is $0, 1, \ldots, K-1$, and $\alpha_1$ and $\alpha_2$ each are any real number, $$\alpha_1 = \frac{\lambda_1}{pK}, \text{ and } \alpha_2 = \frac{\lambda_2}{pK},$$

wherein $\lambda_1$ and $\lambda_2$ each are any one of $0, 1, \ldots, pK-1$.

5. The method according to claim 2, wherein, when $c_r = x_r \times e^{j2\pi r\alpha_1}$, $d_r = x_r \times e^{j2\pi r\alpha_2}$, r is a variable, a value of r is 0, 1, ..., K−1, and $\alpha_1$ and $\alpha_2$ each are any real number, the method further comprises:
  receiving, by the receive end, first signaling, wherein the first signaling comprises first cyclic shift parameter information of the first sequence, and the first cyclic shift parameter information is related to u and $\alpha_1$; and
  receiving, by the receive end, second signaling, wherein the second signaling comprises second cyclic shift parameter information of the second sequence, and the second cyclic shift parameter information is related to v and $\alpha_2$.

6. The method according to claim 2, wherein the base sequence is a Zadoff-Chu (ZC) sequence, a cyclic extension sequence of a ZC sequence, a truncated sequence of a ZC sequence, or a reference signal sequence conforming to a standard of a 3rd Generation Partnership Project (3GPP) Long Term Evolution (LTE) system.

7. A transmit end, comprising:
  a transmitter; and
  a processor, configured to:
    map, to M evenly spaced subcarriers, a first sequence $a_0, a_1, \ldots, a_{M-1}$ comprising M elements, and map, to the M subcarriers, a second sequence $b_0, b_1, \ldots, b_{M-1}$ comprising M elements, wherein the M subcarriers are subcarriers on a same time domain symbol, the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, wherein M=p×K, $$a_i = c_{i \bmod K} \times e^{j\frac{2\pi i u}{M}}, \quad b_i = d_{i \bmod K} \times e^{j\frac{2\pi i v}{M}},$$

i is a variable, a value of i is 0, 1, ..., M−1, u and v each are one of 0, 1, ..., p−1, v is not equal to u, and M, p, and K are all positive integers; and
    generate a to-be-sent signal based on elements on the M subcarriers;
  wherein the transmitter is configured to send the to-be-sent signal generated by the processor,
  wherein the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, and
  wherein:

$$c_r = x_r \times e^{j\frac{2\pi r \beta_1}{K}}, \quad d_r = x_r \times e^{j\frac{2\pi r \beta_2}{K}},$$

r is a variable, a value of r is 0, 1, ..., K−1, and $\beta_1$ and $\beta_2$ each are one of 0, 1, ..., K−1, or
  $c_r = x_r \times e^{j2\pi r\alpha_1}$, $d_r = x_r \times e^{j2\pi r\alpha_2}$, r is a variable, a value of r is 0, 1, ..., K−1, and $\alpha_1$ and $\alpha_2$ each are any real number.

8. A receive end, comprising:
  a receiver, configured to receive a signal on M evenly spaced subcarriers, wherein the M subcarriers are subcarriers on a same time domain symbol; and
  a processor, configured to:
    perform Fast Fourier Transformation (FFT) on the signal received by the receiver, to obtain a first to-be-received signal corresponding to a first sequence $a_0, a_1, \ldots, a_{M-1}$ and a second to-be-received signal corresponding to a second sequence $b_0, b_1, \ldots, b_{M-1}$, wherein the first sequence and the second sequence are code division-orthogonal, the first sequence $a_0, a_1, \ldots, a_{M-1}$ is obtained by extending a third sequence $c_0, c_1, \ldots, c_{K-1}$ having a length of K, and the second sequence $b_0, b_1, \ldots, b_{M-1}$ is obtained by extending a fourth sequence $d_0, d_1, \ldots, d_{K-1}$ having a length of K, wherein M=p×K, $$a_i = c_{i \bmod K} \times e^{j\frac{2\pi i u}{M}}, \quad b_i = d_{i \bmod K} \times e^{j\frac{2\pi i v}{M}},$$

i is a variable, a value of i is 0, 1, ..., M−1, u and v each are one of 0, 1, ..., p−1, v is not equal to u, and M, p, and K are all positive integers; and
    perform signal processing on the first to-be-received signal and the second to-be-received signal,
  wherein the third sequence $c_0, c_1, \ldots, c_{K-1}$ and the fourth sequence $d_0, d_1, \ldots, d_{K-1}$ are sequences obtained by performing cyclic shifts on a same base sequence $x_0, x_1, \ldots, x_{K-1}$, and
  wherein:

$$c_r = x_r \times e^{j\frac{2\pi r \beta_1}{K}},$$
$$d_r = x_r \times e^{j\frac{2\pi r \beta_2}{K}},$$

r is a variable, a value of r is 0, 1, ..., K−1, and $\beta_1$ and $\beta_2$ each are one of 0, 1, ..., K−1, or
  $c_r = x_r \times e^{j2\pi r\alpha_1}$, $d_r = x_r \times e^{j2\pi r\alpha_2}$, r is a variable, a value of r is 0, 1, ..., K−1, and $\alpha_1$ and $\alpha_2$ each are any real number.

9. The receive end according to claim 8, wherein, when $$c_r = x_r \times e^{j\frac{2\pi r \beta_1}{K}},$$
$$d_r = x_r \times e^{j\frac{2\pi r \beta_2}{K}},$$

r is a variable, a value of r is 0, 1, ..., K−1, and $\beta_1$ and $\beta_2$ each are one of 0, 1, ..., K−1, the receiver is further configured to:
  receive first signaling, wherein the first signaling comprises first cyclic shift parameter information of the first sequence, and the first cyclic shift parameter information is related to u and $\beta_1$; and
  receive second signaling, wherein the second signaling comprises second cyclic shift parameter information of the second sequence, and the second cyclic shift parameter information is related to v and $\beta_2$.

10. The receive end according to claim 8, wherein, when $c_r = x_r \times e^{j2\pi r\alpha_1}$, $d_r = x_r \times e^{j2\pi r\alpha_2}$, r is a variable, a value of r is 0, 1, ..., K−1, and $\alpha_1$ and $\alpha_2$ each are any real number, $$\alpha_1 = \frac{\lambda_1}{pK}, \text{ and } \alpha_2 = \frac{\lambda_2}{pK},$$

wherein $\lambda_1$ and $\lambda_2$ each are any one of 0, 1, ..., pK−1.

11. The method according to claim 8, wherein, when $c_r = x_r \times e^{j2\pi r\alpha_1}$, $d_r = x_r \times e^{j2\pi r\alpha_2}$, r is a variable, a value of r is 0, 1, ..., K−1, and $\alpha_1$ and $\alpha_2$ each are any real number, the receiver is further configured to:

receive first signaling, wherein the first signaling comprises first cyclic shift parameter information of the first sequence, and the first cyclic shift parameter information is related to u and $\alpha_1$; and receive second signaling, wherein the second signaling comprises second cyclic shift parameter information of the second sequence, and the second cyclic shift parameter information is related to v and $\alpha_2$.

12. The receive end according to any one of claim 8, wherein the base sequence is a Zadoff-Chu (ZC) sequence, a cyclic extension sequence of a ZC sequence, a truncated sequence of a ZC sequence, or a reference signal sequence conforming to a standard of a 3rd Generation Partnership Project (3GPP) Long Term Evolution (LTE) system.

* * * * *